United States Patent [19]

Taguchi et al.

[11] Patent Number: 5,134,487
[45] Date of Patent: Jul. 28, 1992

[54] USING COMMON CIRCUITRY FOR DIFFERENT SIGNALS

[75] Inventors: Tomishige Taguchi, Urawa; Makoto Kondo, Sagamihara; Toshihiko Mimura; Eiji Ohara, both of Kawasaki, all of Japan

[73] Assignee: Canon Kabushiki Kaisha, Tokyo, Japan

[21] Appl. No.: 610,013

[22] Filed: Nov. 5, 1990

[51] Int. Cl.$^5$ .............................................. H04N 5/92
[52] U.S. Cl. .................................... 358/209; 358/85; 358/310; 358/906; 358/909; 358/134
[58] Field of Search ................. 358/133, 209, 85, 334, 358/310, 330, 906, 909, 134

[56] References Cited

U.S. PATENT DOCUMENTS

| | | | |
|---|---|---|---|
| 4,772,956 | 9/1988 | Roche | 358/85 |
| 4,864,391 | 9/1989 | Taguchi | 358/80 |
| 4,910,604 | 3/1990 | Takei et al. | 358/310 |
| 4,914,746 | 4/1990 | Nishi | 358/334 |
| 5,016,107 | 5/1991 | Sasson | 358/909 |
| 5,027,214 | 6/1991 | Fujimori | 358/209 |

FOREIGN PATENT DOCUMENTS 1-256816 10/1989 Japan.

Primary Examiner—Howard W. Britton
Attorney, Agent, or Firm—Fitzpatrick, Cella, Harper & Scinto

[57] ABSTRACT

Image processing apparatus using common circuitry for different signals includes conversion circuitry for converting an input image signal into another signal form. First control circuitry is provided for giving first control information to the conversion circuitry to cause the conversion circuitry to convert the input image signal into, e.g., a compressed signal. Second control circuitry is provided for giving second control information to the conversion circuitry for causing the conversion circuitry to convert the input image signal into a signal adapted to be stored by a medium. Preferably, a D/A converter is used in common during photographing operations and during reproducing operations. The common circuitry avoids the use of separate circuits for conversion into different signal forms.

18 Claims, 32 Drawing Sheets

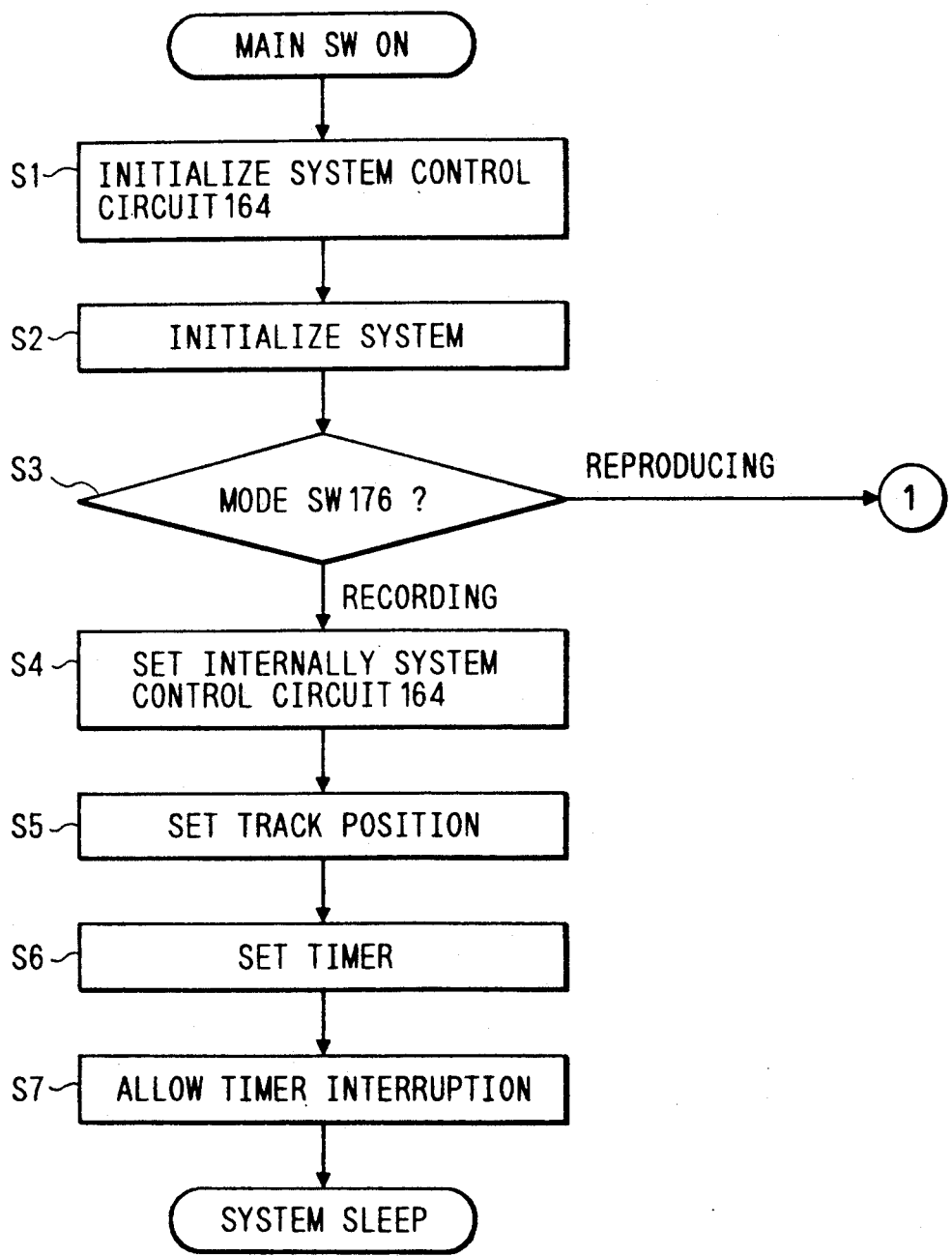

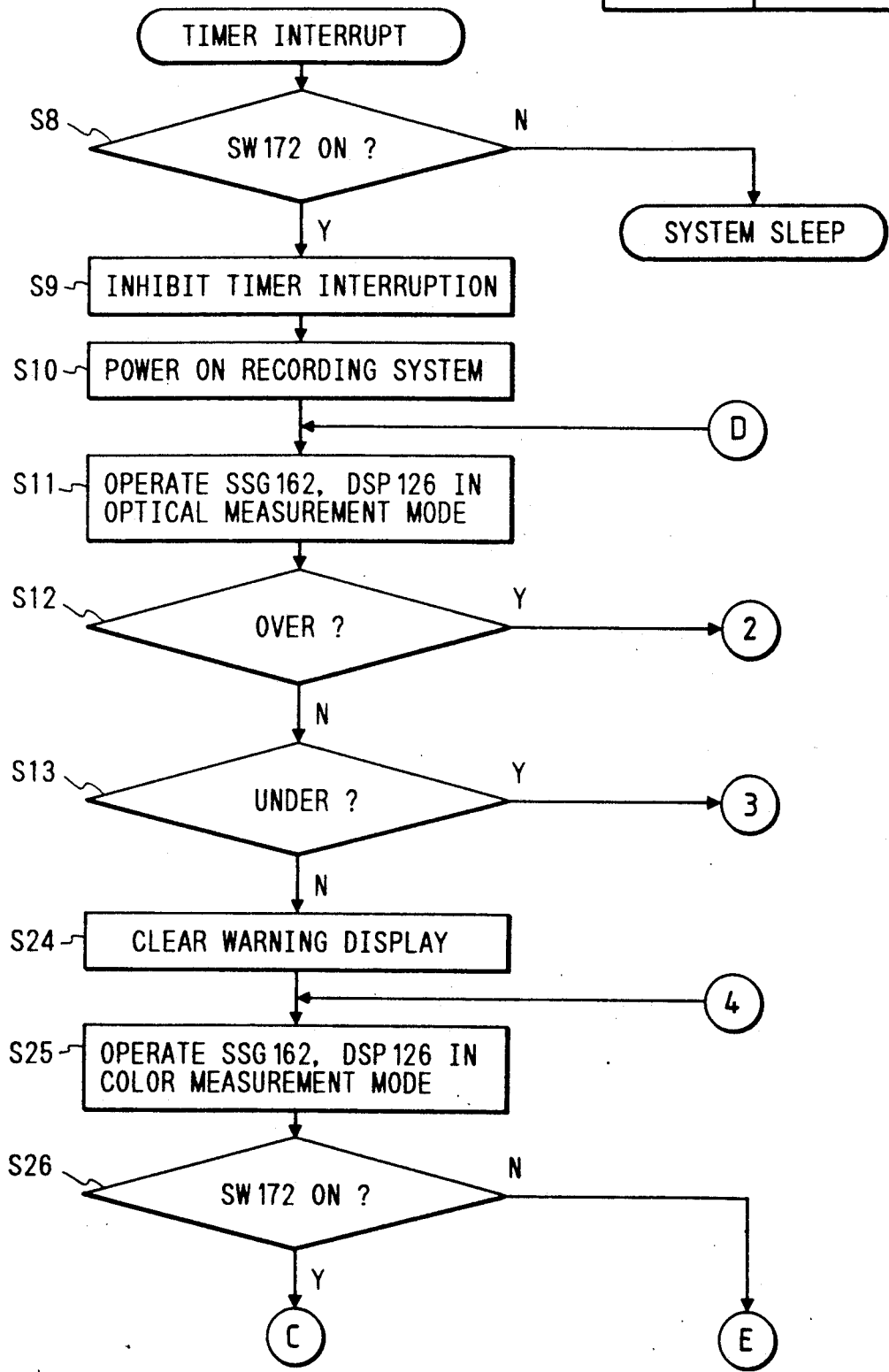

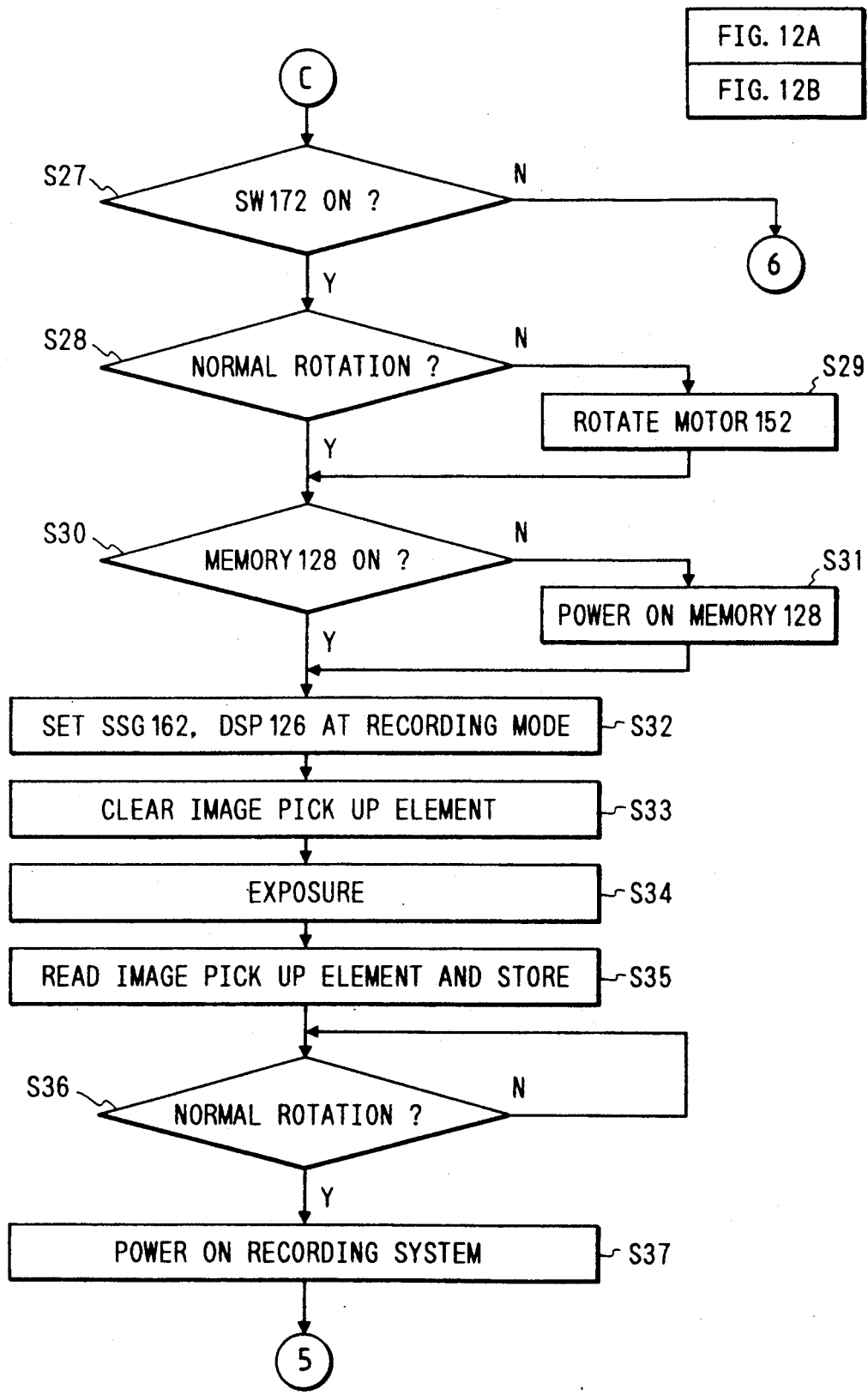

FIG. 17
TO FIG. 18
(a) OUTPUT OF DEMODULATION CIRCUIT 160Y 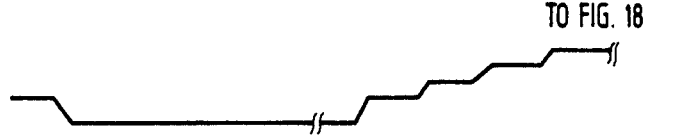
(b) OUTPUT OF DEMODULATION CIRCUIT 160C 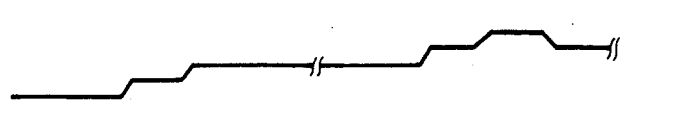
(c) CLOCK OF S/H 118R 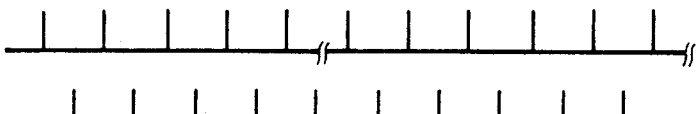
(d) CLOCK OF S/H 118B 
(e) CLOCK OF S/H 118G 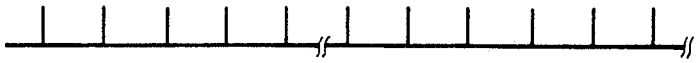
(f) OUTPUT OF CLAMP CIRCUIT 120R 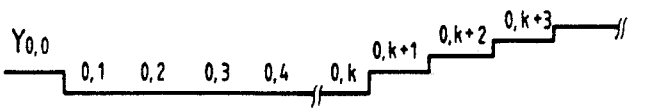
(g) OUTPUT OF CLAMP CIRCUIT 120G 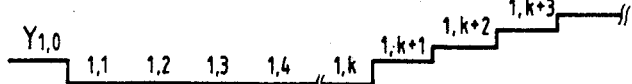
(h) OUTPUT OF CLAMP CIRCUIT 120B 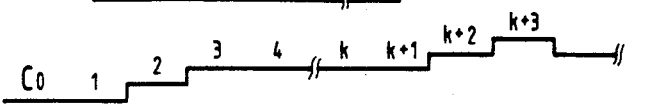
(i) OUTPUT OF A/D 122R 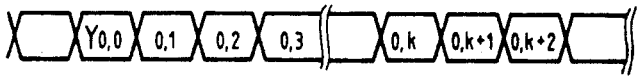
(j) OUTPUT OF A/D 122G 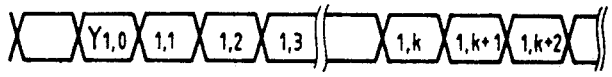
(k) OUTPUT OF A/D 122B 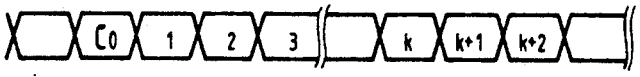
(l) OUTPUT 124a OF MPX 124 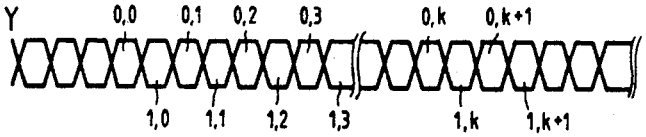
(m) OUTPUT 124b OF MPX 124 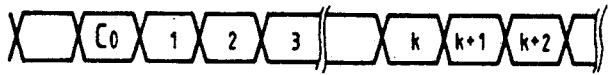
(n) CLOCK φ1
(o) CLOCK φ2 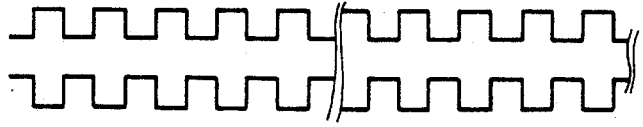

FIG. 24

(1) RECORDING MODE

| | |
|---|---|
| SW 450 | ON |
| SW 452 | OFF |
| SW 454 | ON |
| SW 456 | OFF |
| SW 458 | ON |

(2) REPRODUCING MODE

| | |
|---|---|
| SW 450 | ON ⎍ ON ⎍ ON ⎍ |
| SW 452 | ⎍ ON ⎍ ON ⎍ ON |
| SW 454 | OFF |
| SW 456 | ⎍ ON ⎍ ON |
| SW 458 | ON ⎍ ON ⎍ |

FIG. 27
(1) RECORDING MODE
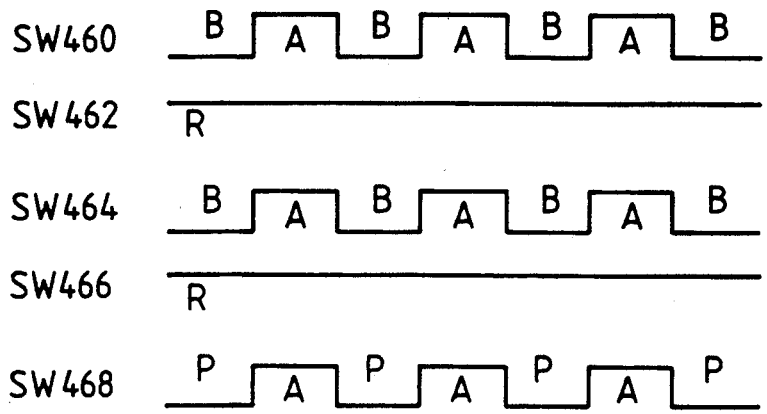
(2) REPRODUCING MODE
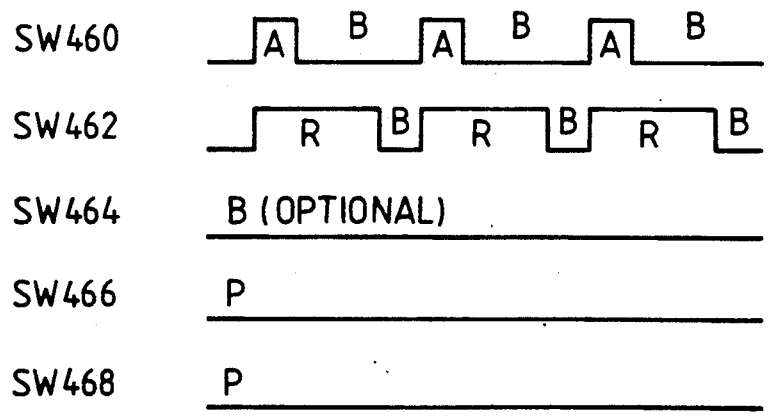

USING COMMON CIRCUITRY FOR DIFFERENT SIGNALS

BACKGROUND OF THE INVENTION

1. Field of the Invention

The present invention relates to an image processing apparatus, and an apparatus capable of transmitting an image signal.

2. Related Background Art

In place of the conventional optical camera utilizing silver halide emulsion, there has been developed an electronic still camera in which an object image is converted into electric signals by an image pickup device and is recorded on a magnetic recording medium. There has also been developed an electronic still camera having a function of image reproduction. In such a conventional electronic still camera, the image signal is read from the image pickup device in synchronization with the rotation of a magnetic disk constituting the recording medium. The color difference signal is converted into a line-sequential signal, and the brightness signal and the line-sequential color difference signal are respectively frequency modulated, then frequency multiplexed and recorded on the magnetic disk.

In the reproducing circuit, the output of a magnetic head is separated by filters into a brightness component and a line-sequential color difference component, which are respectively frequency demodulated to obtain the brightness signal and the line-sequential color difference signals. The line-sequential color difference signals are converted into line-simultaneous signals by a line-simultaneous circuit consisting of a line sense circuit, a line delay circuit and switches. The obtained brightness and line-simultaneous color difference signals are converted by an NTSC encoder into an NTSC image signal which is supplied to an NTSC image monitor, whereby a reproduced image can be obtained.

Also, in case of transmitting the image, recorded on the magnetic disk to another location, the transmitting apparatus stores said image in a frame memory after separating it into color component signals of R, G and B, then reading said signals in a predetermined order and sends said signals to a telephone line after conversion into an analog signal by a D/A converter.

The conventional structure consumes much electric power because of the use of a 1H (one horizontal synchronization period) delay line in the line simultaneous circuit and for the skew compensation in the field reproduction. While the reproduced image is displayed on the monitor, the magnetic disk has to be constantly rotated, thus requiring additional power consumption. Consequently, there is required a battery of a considerably large capacity, in comparison with w that in a camera with recording function only.

Also in case of transmitting the taken image, for example, through a telephone line, there is also required a transmitting apparatus for reproducing and transmitting the image recorded on a magnetic disk, but such transmitting apparatus, if constructed as a separate unit, is wasteful because it contains many components and circuits which are common with those in the electronic still camera.

Although the foregoing explanation is limited to a conventional electronic camera utilizing magnetic disks, such drawbacks are encountered also in other various image processing apparatus, such as a facsimile apparatus with a monitor unit, or a television telephone.

In the electronic still camera handling still images or in the movie camera handling moving image, the image signal is often obtained in some places in the form of primary or complimentary colors, and in other places in the form of a brightness signal and color difference signals. The actual signal processing is often conducted by common hardware, such as image memories or digital signal processors (DSP). For storing the image signal in the image memory, an A/D converter is required for converting the analog signal into a digital signal. For this purpose, there is already known a circuit structure utilizing two A/D converters for the brightness signal and the color difference signals, in which the image signal of primary (or complementary) colors is converted into brightness signal and color difference signals, which are then converted into digital signals by said A/D converters. Also, there is known a circuit structure utilizing an A/D converter capable of high-speed digitization of a serial image signal of primary (or complementary) colors, wherein the digitized signal is converted into the brightness signal and color difference signals in or after the image memory.

In either conventional structure, for effecting the A/D conversion in order to process the image signal of primary or complimentary colors and the image signal composed of brightness signal and color difference signals by means of a common digital processing circuit, there is required a conversion circuit for signal conversion into either signal form, and/or a high-speed A/D converter capable of digitizing at least the brightness signal, or preferably the serial signal of primary colors (for example RGB dot-sequential signal).

Such a high-speed A/D converter has drawbacks of a large circuit structure and high power consumption, and, when used in combination with an A/D converter of a relatively low speed, it is extremely difficult to match the characteristics (reference voltage, non-linearity etc.) of these A/D converters.

Besides, the conventional circuit structure is inevitably complex because exclusive circuits are required for the signal compression at recording and for the signal expansion at reproduction.

SUMMARY OF THE INVENTION

An object of the present invention is to provide an image processing apparatus or an image transmitting apparatus capable of resolving the above-mentioned drawbacks totally or individually.

Another object of the present invention is to provide an image processing apparatus or an image transmitting apparatus capable of achieving multiple functions with a simple structure.

The foregoing objects can be attained, according to a preferred embodiment of the present invention, by an image processing apparatus comprising conversion means for converting an input image signal to another signal form; first means for providing said conversion means with first control information to effect compressed conversion on said input image signal; and second means for providing said conversion means with second control information to effect a conversion from said input image signal to a predetermined signal form suitable for storage on a recording medium, whereby separate circuits are not required for conversion into different signal forms and the entire circuit structure can be made more compact.

Still another object of the present invention is to provide an image processing apparatus capable of A/D conversion of plural signals with a simple structure.

Still another object of the present invention is to provide an image processing apparatus capable of signal compression and expansion with a simple structure.

Still other objects of the present invention, and the features thereof, will become fully apparent from the following description of the embodiments, to be taken in conjunction with the attached drawings.

BRIEF DESCRIPTION OF THE DRAWINGS

FIGS. 9, 9A, 9B, 10, 11, 11A, 11B, 12, 12A, 12B and 13 are flow charts of recording and reproduction of in the embodiment shown in FIG. 8;

FIGS. 17 and 18 are timing charts of the reproducing operation of the embodiment shown in FIG. 8;

FIG. 24 is a timing chart of signals in the circuit shown in FIG. 23;

FIG. 27 is a timing chart of signals of the circuit shown in FIG. 26;

DESCRIPTION OF THE PREFERRED EMBODIMENTS

Figure 1:
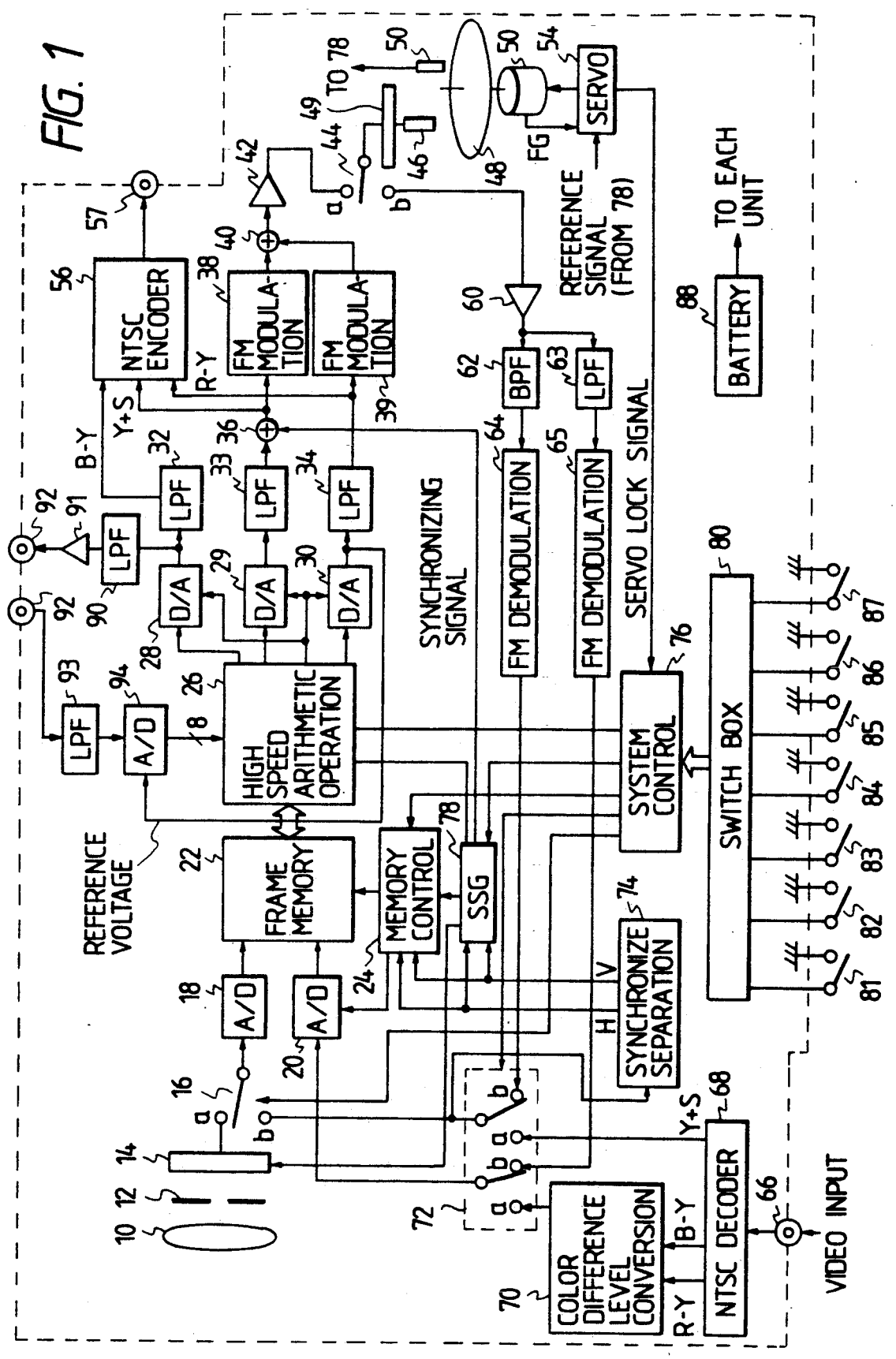
FIG. 1 is a block diagram of a first embodiment of the present invention.

FIG. 1 is a block diagram of an embodiment of the present invention, wherein provided are a phototaking lens 10; a diaphragm 12; an image pickup circuit 14 including a CCD image sensor device; a switch 16 for selecting either the output signal of the image pickup circuit 14, or an external or reproduced image signal; A/D converters 18, 20; a frame memory 22; a memory control circuit 24 for controlling the frame memory 22; a high speed arithmetic operation unit 26 for converting the stored data of the frame memory 22 into an output format; D/A converters 28, 29, 30; low-pass filters (LPF) 32, 33, 34 for removing the unnecessary band component generated by the D/A converters 28, 29, 30; an adder 36 for adding a synchronization signal to the brightness signal; frequency modulation circuits 38, 39; an adder 40; a recording amplifier 42; a recording/reproduction selector switch 44; a magnetic head 46; a magnetic disk 48; a head moving device 49 for moving the magnetic head 46 to a designated track position of the magnetic disk 48; a PG coil 50 for detecting the rotational phase of the magnetic disk 48; a motor 52 for rotating the magnetic disk 48; a servo circuit 54 for the motor 52; an NTSC encoder 56; and an image output terminal 57.

There are further provided a reproducing amplifier 60; a band pass filter 62 for extracting the brightness component from the reproduced signal; a low-pass filter 63 for extracting the color difference components from the reproduced signal; frequency demodulating circuits 64, 65; an external image input terminal 66; an NTSC decoder 68 for separating the external image signal into a brightness signal and two color difference signals; a color difference level conversion circuit 70 for converting the color difference signals R-Y, B-Y into line sequential signals and converting the DC level of said color difference signals into a level defined in the still video format; a switch 72 for selecting the external image signal or the reproduced image signal; and a synchronization separating circuit 74 for separating the synchronization signal from the brightness signal selected by the switch 72.

There are further provided a system control circuit 76 for controlling the entire system; a standard signal generator (SSG) circuit 78 for supplying reference signals to various units; a switch box 80 for entering various operation commands to the system control circuit 76 and including a shutter switch 81, a release switch 82, a record/reproducing switch 83, an input video switch 84, a track forwarding switch 85, a track reversing switch 86 and transmission switch 87; a battery 88 for supplying electric power to various units; a low-pass filter 90; a transmitting amplifier 91; an acoustic coupling terminal 92; and a low-pass filter 93.

At first there will be explained the recording (phototaking) operation of the apparatus shown in FIG. 1. When a shutter release button is lightly depressed, the release switch 82 is closed, and the shutter switch 81 is then closed upon further depression. The closing of the release switch 82 is transmitted through the switch box 80 to the system control circuit 76, which in response starts the power supply to the image pickup circuit 14, A/D converters 18, 20, standard signal generator 78, frame memory 22, memory control circuit 24, servo circuit 54 and motor 52. The standard signal generator 78 provides, based on a PG signal from the PG coil 50, the servo circuit 54 with a reference signal constituting a reference for the rotation of the magnetic disk 48, and the servo circuit 54 controls the rotation of the motor 52 based on said reference signal and an FG signal from the motor 52.

Figure 2:
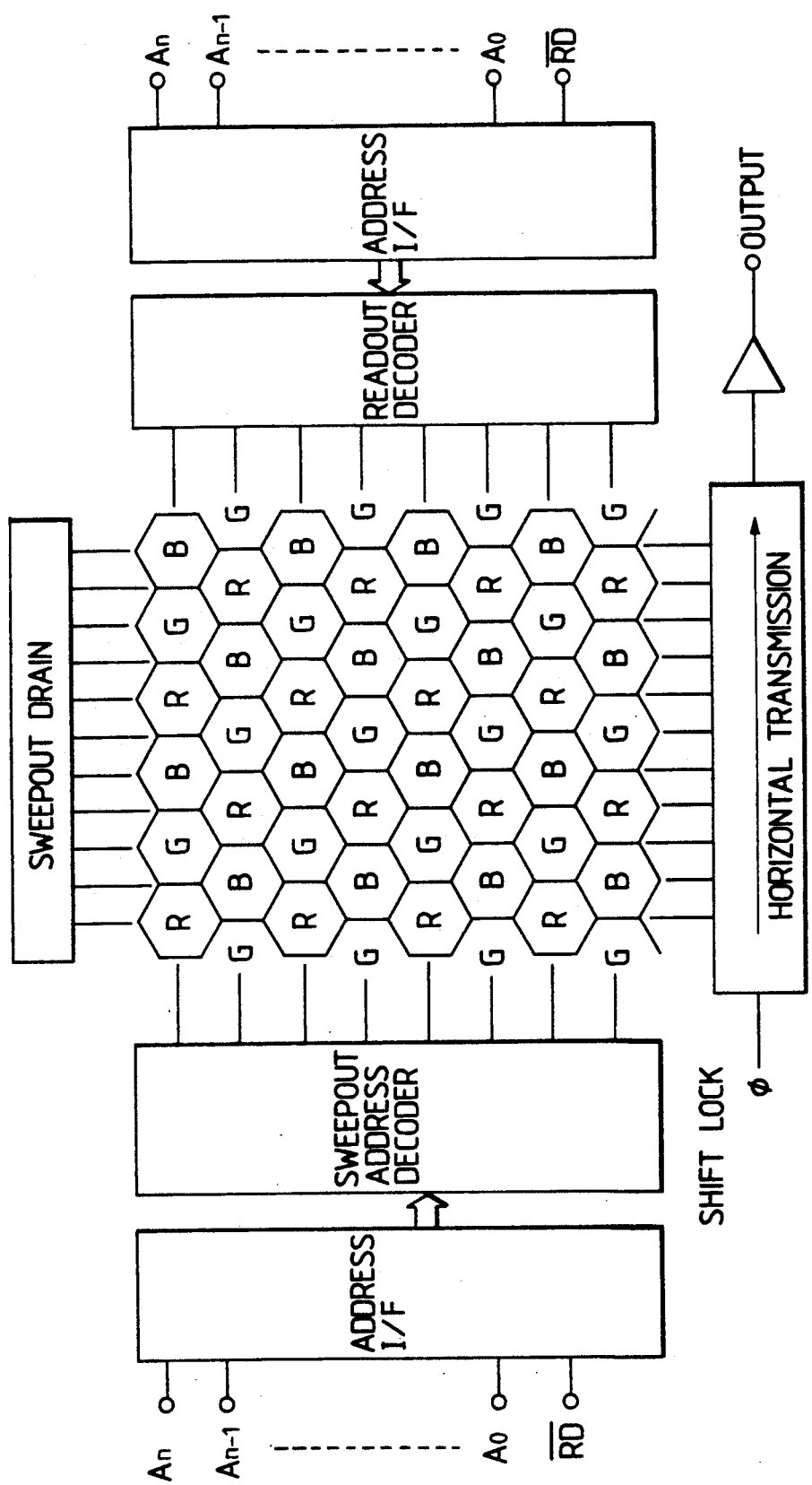
FIG. 2 is a view showing the circuit structure of an image pickup device and the arrangement of color filters.
Figure 3:
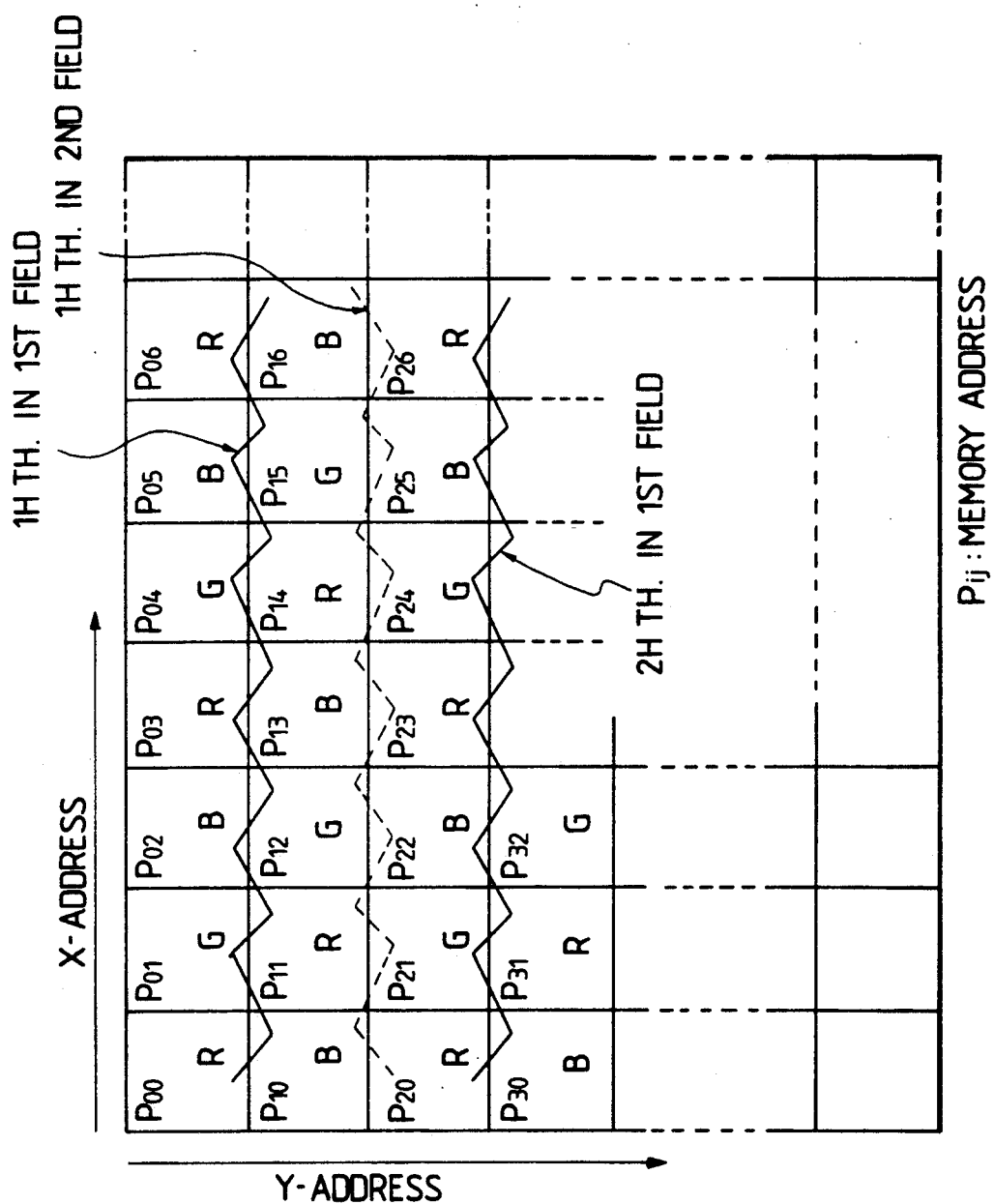
FIG. 3 is a view showing the order of data readout and data processing of a frame memory 22 at the image taking and recording.

Then, in response to the closing of the shutter switch 81, the diaphragm 12 is so controlled as to obtain an appropriate exposure, and the image pickup circuit 14 accumulates charges, corresponding to the light coming from an object, for a predetermined period. Said charges are read by clock signals from the standard signal generator 78. FIG. 2 shows the circuit structure of the image pickup circuit 14 and the filter arrangement of the photoelectric conversion device. These structures will not be explained in detail since they are already known. The output of the image pickup circuit 14 is supplied through the switch 16 to the A/D converter 18, digitized therein and stored in succession in the frame memory 22. When the rotation of the magnetic disk 48 becomes stabilized at a predetermined value, the servo circuit 54 sends a servo locking signal to the system control circuit 76, which in response activates the high-speed arithmetic operation circuit 26, thereby releasing the stored data of the frame memory 22 with conversion to the recording format for the magnetic disk 48. More specifically, the pixel data stored in the frame memory 22 in the order of color filter arrangements of the photoelectric conversion device of the image pickup circuit 14 as shown in FIG. 3 are converted into brightness data Y and color difference data R-Y, B-Y, utilizing an odd line and an immediately succeeding line in a first field as indicated by a solid line, or utilizing an even line and an immediately succeeding line in a second field as indicated by a broken line. Thus, in the first pixel in the first field, there are obtained:

$$Y_{00} = K_1 G(P_{01}) + K_2 R(P_{00}) + K_3 B(P_{10})$$

$$(R-Y)_{00} = R(P_{00}) - Y_{00}$$

$$(B-Y)_{00} = B(P_{10}) - Y_{00}$$

and, in the second pixel there are obtained:

$$Y_{00} = K_1 G(P_{01}) = K_2 R(P_{00}) + K_3 B(P_{10})$$

$$(R-Y)_{00} = R(P_{00}) - Y_{00}$$

$$(B-Y)_{00} = B(P_{10}) - Y_{00}$$

wherein $K_1 = 0.59$, $K_2 = 0.3$ and $K_3 = 0.11$, and $P_{ij}$ is the address of the frame memory 22 (cf. FIG. 3).

Figure 4:
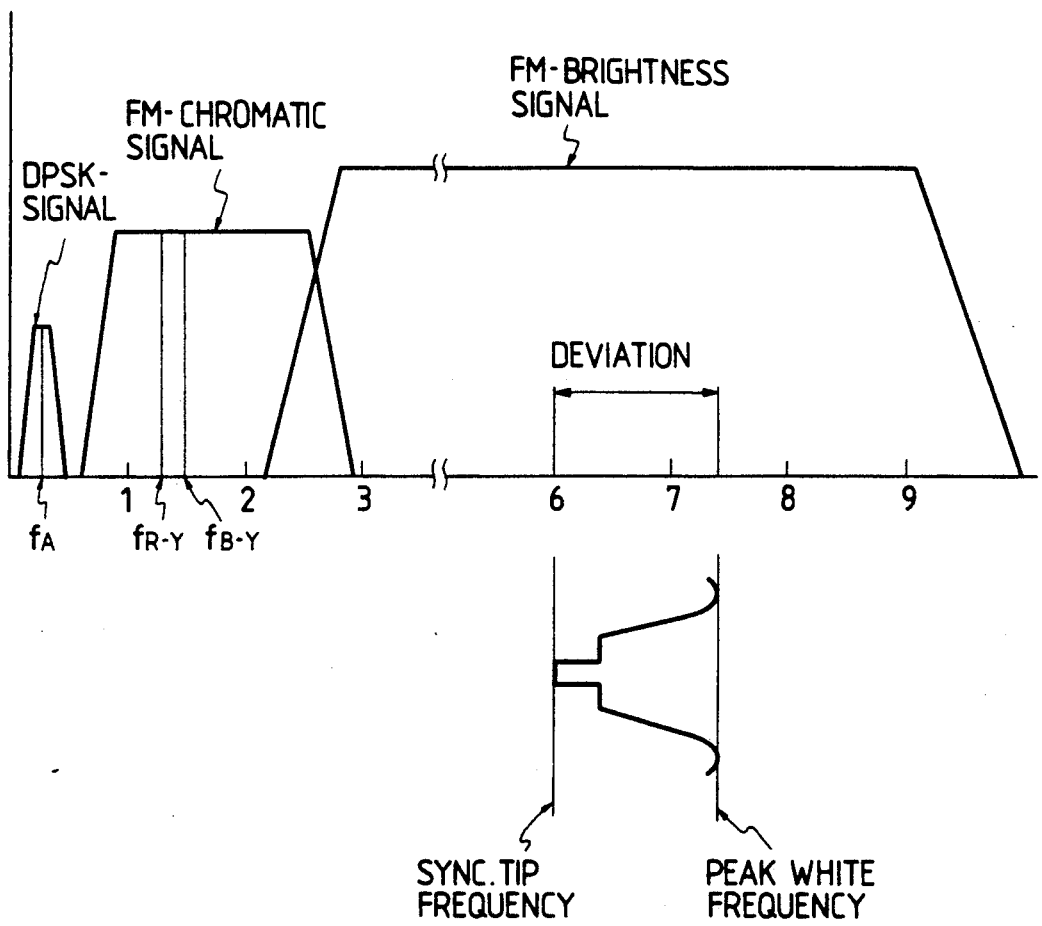
FIG. 4 is a chart showing the frequency allocation of the recording signal of a magnetic disk 48.

The brightness data obtained in the high-speed arithmetic operation unit 26 are supplied to the D/A converter 29, while the color difference data R-Y, B-Y are alternately, by every line, to the D/A converter 30. The conversion frequencies of the D/A converters 29, 30 are determined by the recording frequency band of the magnetic disk 48. The outputs of the D/A converters 29, 30 are subjected to elimination of the unnecessary band components by the low-pass filter 33, 34, then to addition of the synchronization signal to the brightness signal in the adder 36, and are frequency modulated in the modulation circuits 38, 39. FIG. 4 shows the frequency allocation of the brightness signal and the color difference signals. The brightness signal and color difference signals subjected to frequency modulation are frequency multiplexed in the adder 40, then amplified by the recording amplifier 42 and supplied to the magnetic head 46 for recording on the magnetic disk 48.

Upon recording of an image, the system control circuit 76 moves the magnetic head 46 by a head carrier 49 to the inside of the disk and awaits the next phototaking operation. If the release switch 82 is closed in this state, the motor 52 is maintained in rotation. If said switch is open, the motor 52 is stopped and the power supply to the circuits 14, 18, 20, 22, 26, 28, 29, 30, 38 and 39 are interrupted.

In the following there will be explained the reproducing operation of the image recorded on the magnetic disk 48. When the record/reproduction switch 83 is shifted to the reproduction side, the reproduction mode is assumed, whereby the switches 44, 72 are both connected to contacts b. The reproduction output from the magnetic head 46 is supplied through the switch 44 and the reproducing amplifier 60 to the band-pass filter 62 and the low-pass filter 63, thereby being separated into a modulated brightness signal and modulated color difference signals. Said signals are demodulated by the frequency demodulating circuits 64, 65 into the brightness signal and the color difference signals of base band, which are supplied through the switch 72 to the A/D converters 18, 20, digitized therein and stored in the frame memory 22. The synchronization separating circuit 74 separates, from the demodulated brightness signal, the horizontal and vertical synchronizations signals, which are supplied to the standard signal generator 78 and the system control circuit 76.

The system control circuit 76 sends a command to the standard signal generator 78 for releasing a timing signal, for determining the timing of data fetched from the frame memory 22, and the memory control circuit 24 provides the A/D converters 18, 20 with a conversion timing signal synchronized with the horizontal synchronization signal H and the vertical synchronization signal V separated by the synchronization separating circuit 74. Also, the memory control circuit 24 sends write-in addresses to the frame memory 22, under the control of the control signal from the standard signal generator 78. During the fetching of image data of a frame into the frame memory 22, the D/A converters 28, 29 and 30 are muted.

Figure 5:
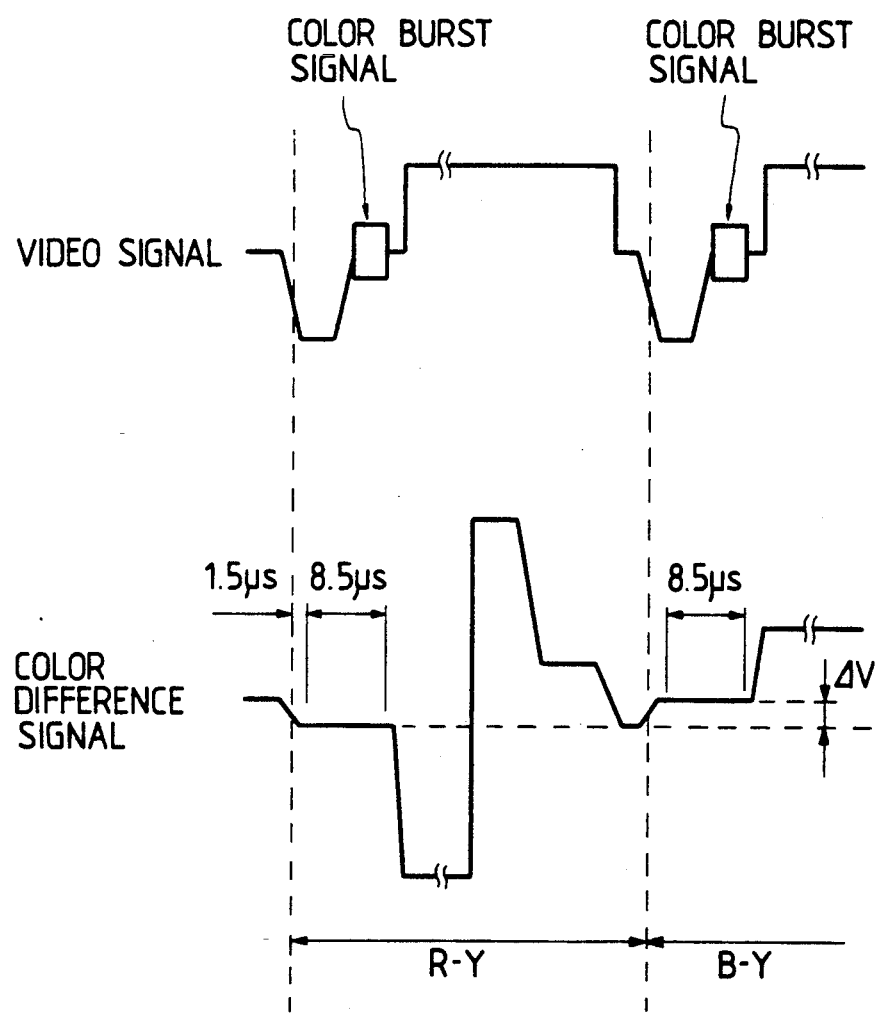
FIG. 5 is a chart showing the DC level of a line-sequential color difference signal.

The A/D converter 20 receives line-sequential color difference signals, with different DC levels in the R-Y and B-Y components as shown in FIG. 5. These signals are simply digitized in the A/D converter 20 and stored in the frame memory 22. The R-Y component and B-Y component can be distinguished, according to the DC level thereof, by the high-speed arithmetic operation circuit 26 either at the recording into the frame memory 22 or the reading from the frame memory 22.

Figure 6:
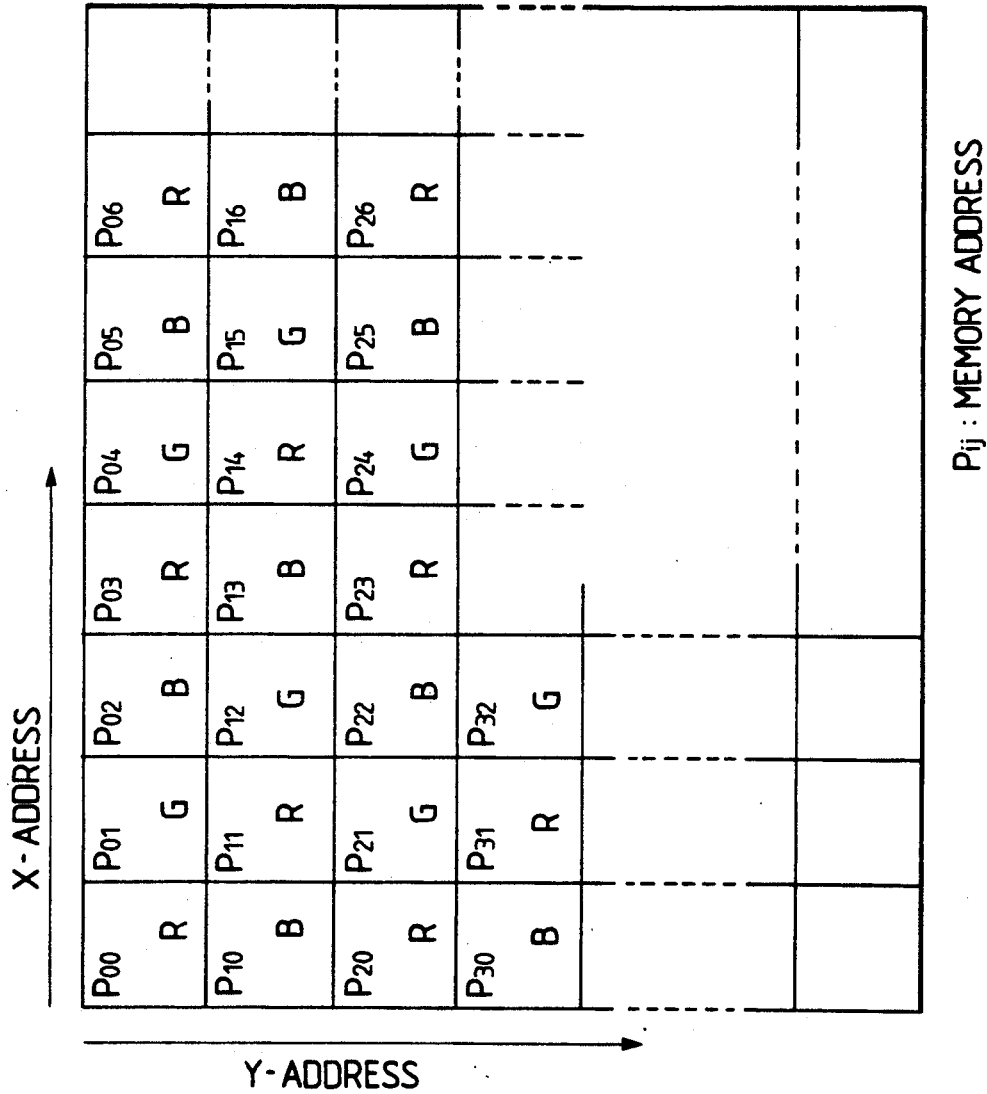
FIG. 6 is a view showing the storage positions of output data of an image pickup circuit 14 in the frame memory 22.
Figure 7:
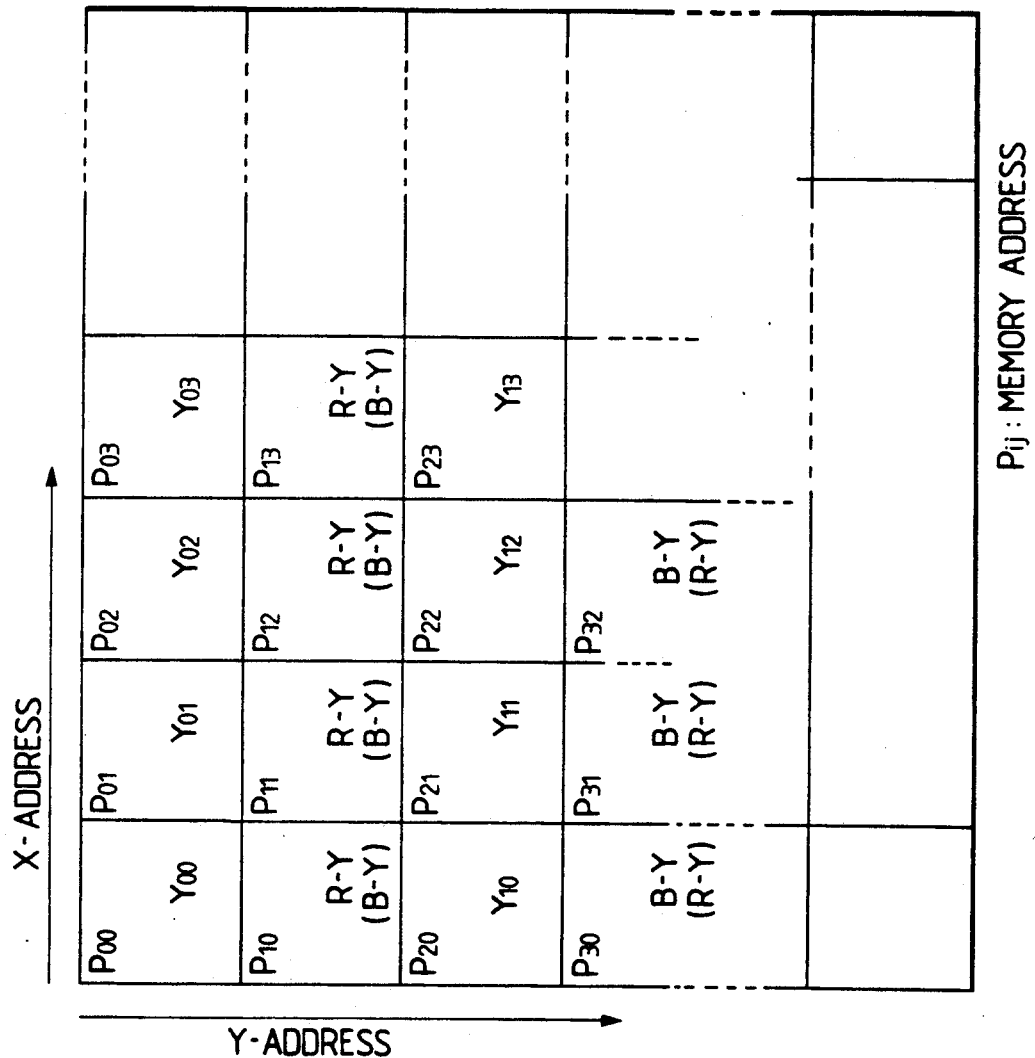
FIG. 7 is a view showing the storage positions of a signal reproduced from the magnetic disk 48 into the frame memory 22.

At the phototaking operation, the frame memory stores the pixel data from the image pickup device in the order of they are output therefrom as shown in FIG. 6, but, at the reproducing operation from the magnetic disk 48, said memory stores the signals in the form of brightness signal and line-sequential color difference signals as shown in FIG. 7.

Upon completion of the data writing into the frame memory 22, the standard signal generator 78 sends a timing signal for starting arithmetic operation to the high-speed arithmetic operation circuit 26, which sends the brightness data of the frame memory to the D/A converter 29, the line-simultaneous color difference data B-Y to the D/A converter 28, and the line-simultaneous color difference data R-Y to the D/A converter 30. Said D/A converters 28, 29, 30 convert said data into analog signals, according to a conversion clock signal from the high-speed arithmetic operation circuit 26. Naturally there may be employed independent clock signals matching the bands of said data. The obtained analog brightness and color difference signals are subjected to elimination of the unnecessary band components by the low-pass filters 32, 33, 34, then to addition of the synchronization signal to the brightness signal by the adder 36, and are converted into an NTSC video signal by the NTSC encoder 56, of which output is supplied, through the output terminal 57, to an external monitor unit.

In the following there will be explained the operation of recording an external image signal on the magnetic disk 48. In this case, in response to the input video switch 84, the switches 44, 72 are both connected to the contacts a. The image signal provided to the external image input terminal 66 is separated, by the NTSC decoder 68, into a brightness signal including synchronization signals, and color difference signals R-Y, B-Y. Said color difference signals are converted into line-sequential signals with predetermined DC offsets, as in the recording onto the magnetic disk 48, by the color difference level conversion circuit 70. The brightness signal from the NTSC decoder 68 and the line-sequential color difference signals from the color difference level conversion circuit 70 are supplied, respectively through the switches 72, 16, to the A/D converters 18, 20.

When the shutter release button is depressed in this state, the release switch 82 is closed to power the A/D converters 18, 20, frame memory 22, memory control circuit 24, motor 52 and servo circuit 54, thereby rotating the magnetic disk 48. Then, in response to the closing of the shutter switch 81, the memory control circuit 24 supplies the A/D converters 18, 20 with conversion clock signals and the frame memory 22 with a write-in signal and a write-in address signal, whereby the signals are stored in the frame memory 22 as shown in FIG. 7.

When the rotation of the magnetic disk 48 becomes stabilized, the servo circuit 54 provides the system control circuit 76 with a servo locking signal, whereby the high-speed arithmetic operation circuit 26 is activated to send the brightness data to the D/A converter 29 and the line-sequential color difference data to the D/A converter 30. Thereafter signal recording on the magnetic disk 48 is conducted in the same manner as in the phototaking and recording operation.

In the following there will be explained the operation of transmitting image data stored in the frame memory 22. In case of phototaken image data, data of each pixel are stored in the frame memory 22 as shown in FIG. 6. At first, data of each color is subjected to data compression by one-dimensional ADPCM. Then the D/A converter 28 is used as a digital modulator to effect QAM, and the data are transmitted to a public telephone line through the low-pass filter 90, amplifier 91 and acoustic coupling terminal 92. The data read-out from the frame memory 22 is conducted, for example, in the following order:

Red: $P_{00}, P_{11}, P_{03}, P_{04}, \ldots$
Green: $P_{01}, P_{12}, P_{04}, P_{15}, \ldots$
Blue: $P_{10}, P_{02}, P_{13}, P_{05}, \ldots$ Also, in case of transmitting the image signal reproduced from the magnetic disk 48 or the external image signal entered from the external input terminal 66, the frame memory 22 stores the data of each pixel as shown in FIG. 7. At first the brightness signal and the color difference signals are separately subjected to data compression by one- or two-dimensional ADPCM, and the data are transmitted to the telephone line by QAM modulation as explained above.

The signal received from the telephone line is supplied through the low-pass filter 93 to the A/D converter 94 for digitization therein. The reference voltage of the A/D converter 94 is supplied from the output of the D/A converter 30, and is made lower or higher respectively when the received signal level is low or high, thereby expanding the dynamic range of the A/D converter 94. This adjustment is completed before the reception of the image data. Upon completion of said adjustment, a QAM demodulating circuit in the high-speed arithmetic operation circuit 26 is activated to demodulate the received signal. The signal is further subjected to ADPCM demodulation, and stored in succession in the frame memory 22.

The kind of image data, namely RGB data, brightness-color difference data, or NTSC video data, can be distinguished from control data to be transmitted prior to the image data.

In the foregoing a magnetic disk is taken as an example of the recording medium, but it is naturally possible to use a magnetooptical disk, an IC card or a magnetic tape.

The present embodiment enables the entire circuit structure to be made more compact by effective utilization of the image memory at recording, reproduction and transmission. Also the present embodiment allows the electric power consumption to be reduced and the reproduced image to be stabilized, since the recording medium need not be continuously drive during image reproduction. Also, the manufacturing cost can be reduced since a line sensing circuit is not required for the reproduction of the signal recorded on the recording medium. Furthermore, the memory control circuit 24 is provided with first readout means for displaying the data stored in the image memory means as a visible image and second readout means for data reading according to the transmission capacity of the transmission channel, but it is also possible to utilize a separate readout circuit. Also D/A converters are employed for converting the data read from the image memory means, but there may be employed other circuits, such as a look-up table for tonal conversion or a color correcting table.

In the following there will be explained a second embodiment of the present invention.

Figure 8:
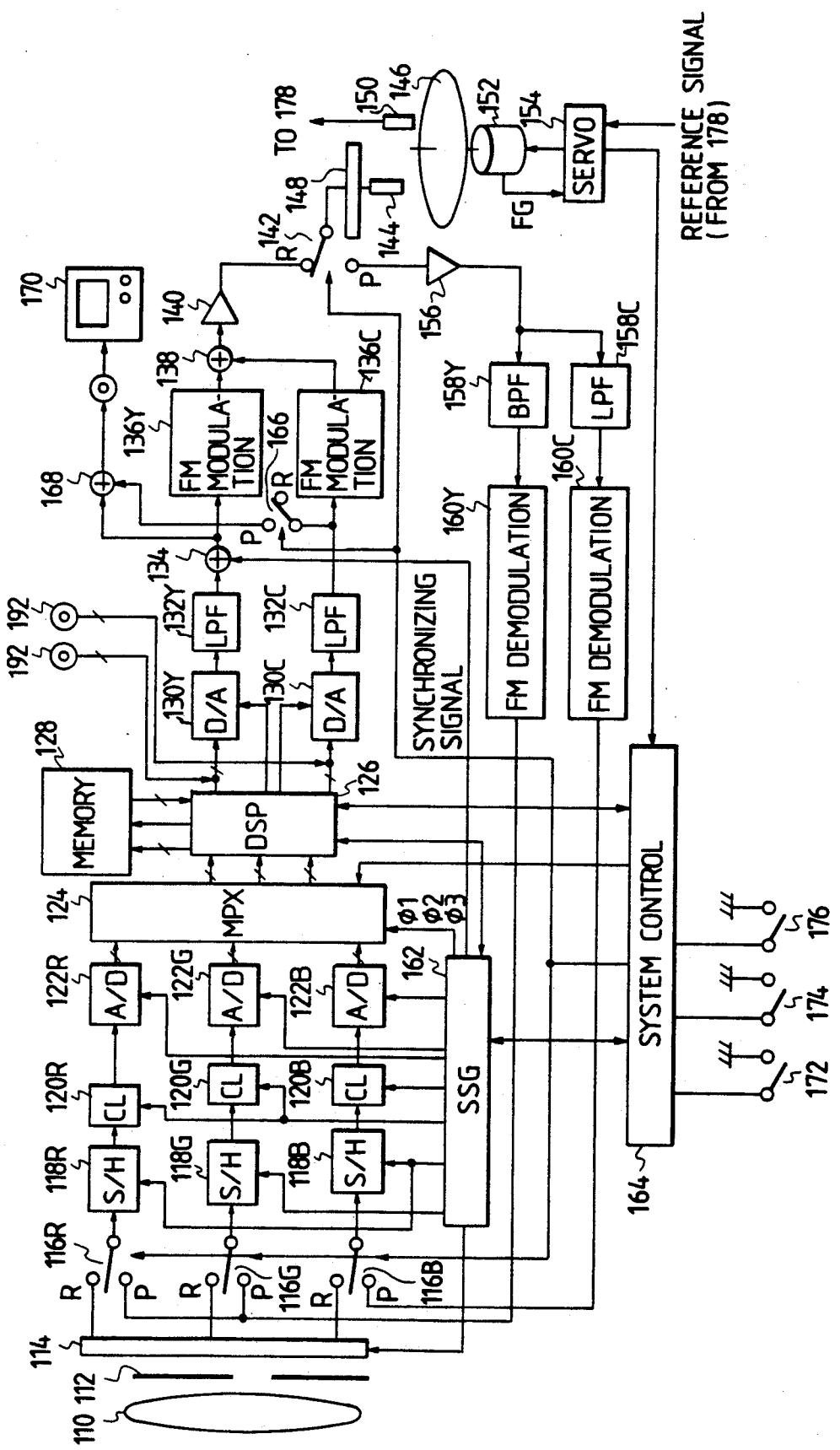
FIG. 8 is a block diagram of another embodiment of the present invention.
Figure 9B:
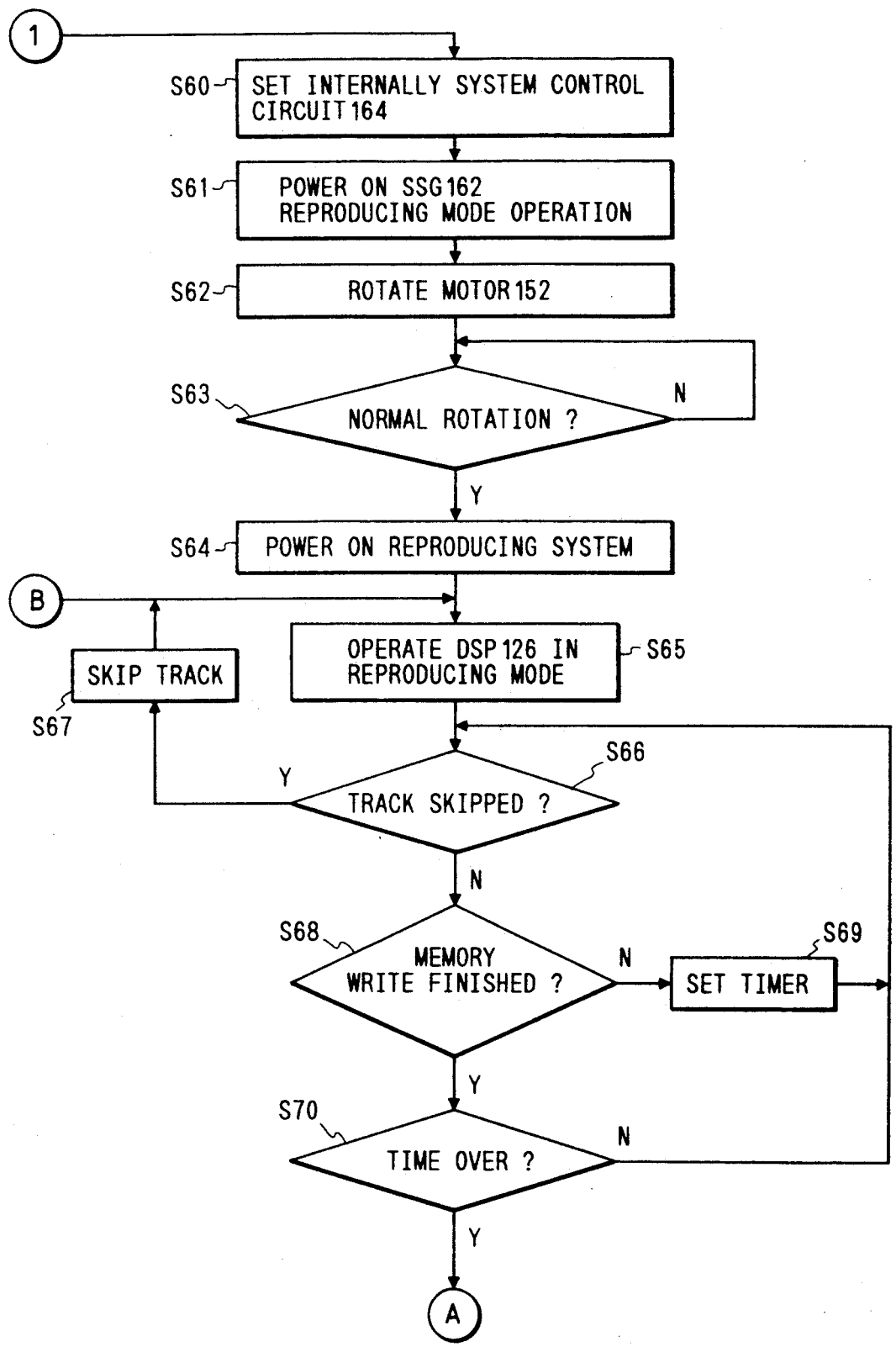
Figure 10:
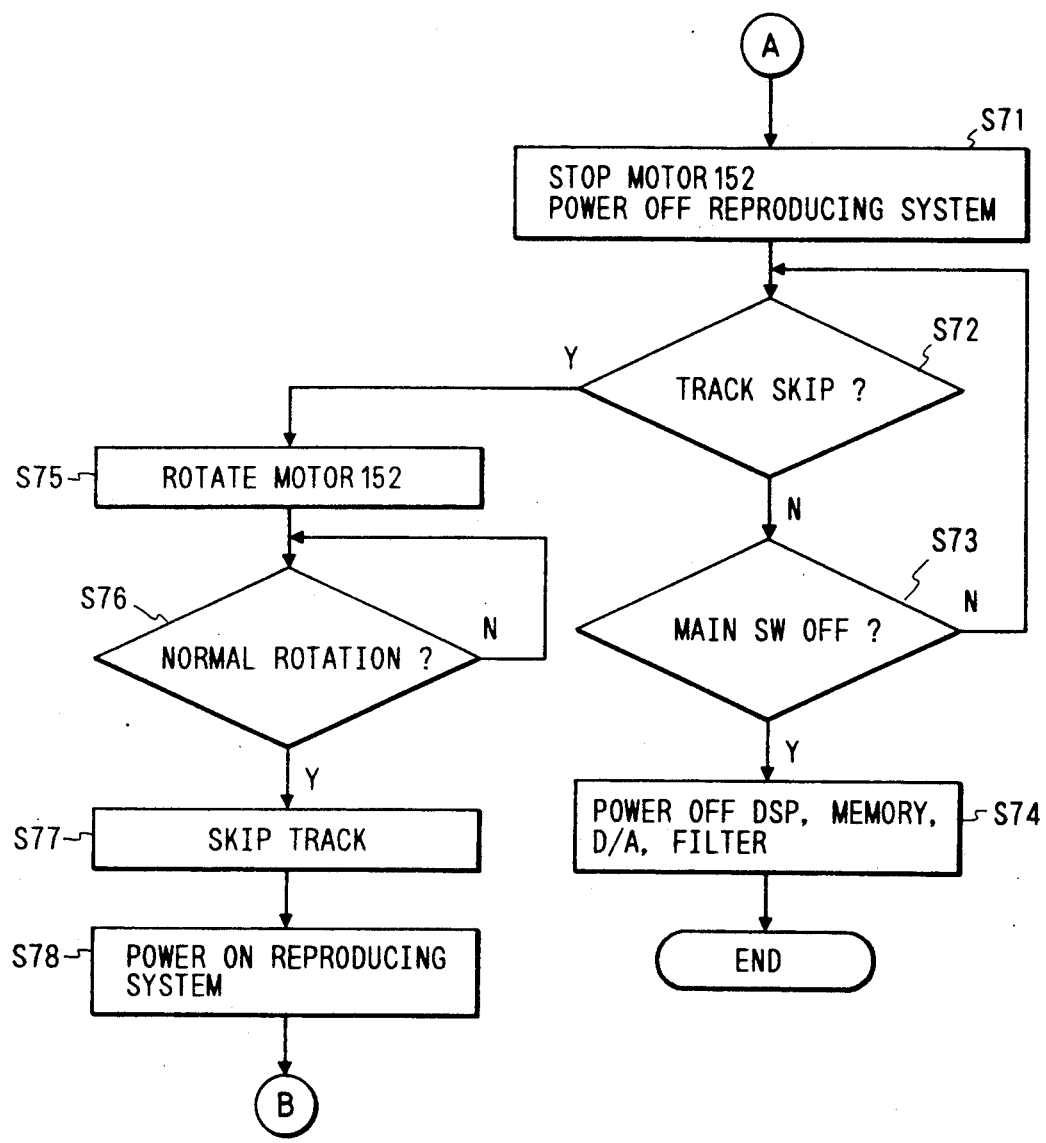

FIG. 8 is a block diagram of the second embodiment of the present invention, wherein shown are a phototaking lens 110; a diaphragm 112; an image pickup device 114 for converting an optical image into electrical R, G and B signals; switches 116R, 116G, 116B for selecting the R, G, B output signals of the image pickup device 114 or reproduced signals to be explained later; sample hold (S/H) circuits 118R, 118G, 118B; clamp circuits 120R, 120G, 120B; A/D converters 122R, 122G, 122B; a multi-plexer (MPX) 124 for time-axis multiplexing the outputs of the A/D converters 122R, 122G, 122B; a digital signal processor (DSP) 126; and a frame memory 128 capable of storing image data of a frame under the control of the DSP 126.

There are further provided D/A converters 130Y, 130C for converting data from the DSP 126 into analog signals; low-pass filters (LPF) 132Y, 132C for removing the unnecessary band components generated by the D/A converters 130Y, 130C; an adder 134 for adding synchronization signals to the brightness signal; frequency modulating circuits 136Y, 136C; an adder 138; a recording amplifier 140; a record/reproduction selector switch 142; a magnetic head 144; a magnetic disk 146; a head moving device 148 for moving the magnetic head 144 to the position of a designated track of the magnetic disk 146; a PG coil 150 for detecting the rotational phase of the magnetic disk 146; a spindle motor 152 for rotating the magnetic disk 146; and a servo circuit 154 for the motor 152.

There are further provided a reproducing amplifier 156; a band-pass filter (BPF) for extracting the brightness component from the reproduced signal; a low-pass filter (LPF) 158C for extracting the color difference components from the reproduced signal; and frequency demodulating circuits 160Y, 160C. The output of the circuit 160Y is supplied to contacts P of the switches 116R, 116G, while that of the circuit 160C is supplied to a contact P of the switch 116B.

There are further provided a synchronization signal generator (SSG) 162 for generating synchronization signals required in various parts of the circuit; a system control circuit 164 for controlling the entire circuit; a switch 166 to be closed at the image reproduction; an adder 168 for supplying a monitor unit 170 with the brightness signal in the recording (phototaking) operation, or the reproduced brightness signal superposed with the reproduced color difference signals at the reproducing operation; switches 172, 174 to be closed in succession by a half-stroke depression and a full-stroke depression of an unrepresented shutter release button; a mode switch 176 for selecting the recording mode or the reproducing mode; and terminals 191, 192 for entering data from an external line to the DSP 126 or releasing data from the DSP 126 to the external line.

In the following there will be explained the function of the circuit shown in FIG. 8, with reference to FIGS. 9, 10, 11, 12 and 13. When an unrepresented main switch is closed, the system control circuit 164 initializes the interior (registers, I/0 ports etc.) and the system (mechanisms such as the diaphragm 12, interface with the outside etc.) (S1, S2). Then, the sequence branches to the recording mode and the reproduction mode according to the state of the mode switch 176 (S3).

At first, the recording (phototaking) operation will be explained. In this operation, it is desirable to maintain the main switch closed except for the periods of transportation or storage of the apparatus in order not to lose the opportunity of phototaking, but is also desirable to save the power consumption. For this purpose, in the present embodiment, the state of the switch 72 is monitored at a constant interval by the timer interruption procedure.

In the recording mode, at first the registers and flags are set in the system control circuit 164 (S4), then the switches 116R, 116G, 116B, 142, 166 are connected to the contact R, and the magnetic head 144 is moved by the head moving device 148 to the outermost unrecorded track (S6). Whether a track is already recorded or not can be identified by the detection, or not, of a carrier signal. Said identification may be conducted at each closing of the main switch, or by monitoring and storing the recorded/unrecorded state of all the tracks in a memory at the loading of a magnetic disk 146 and thereafter correcting the content of said memory according to the subsequent recording and erasing operations.

Figure 11B:
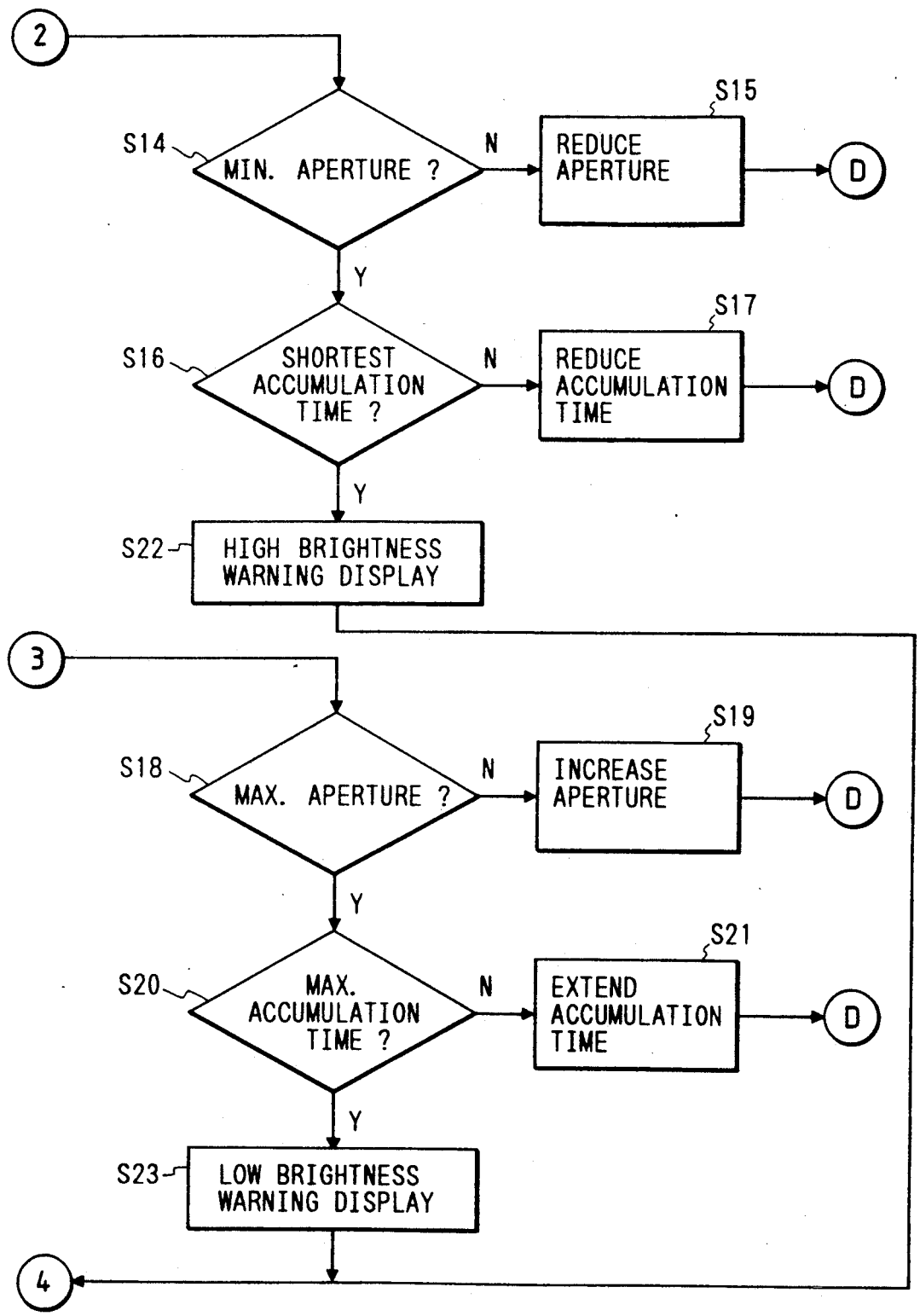
Figure 12B:
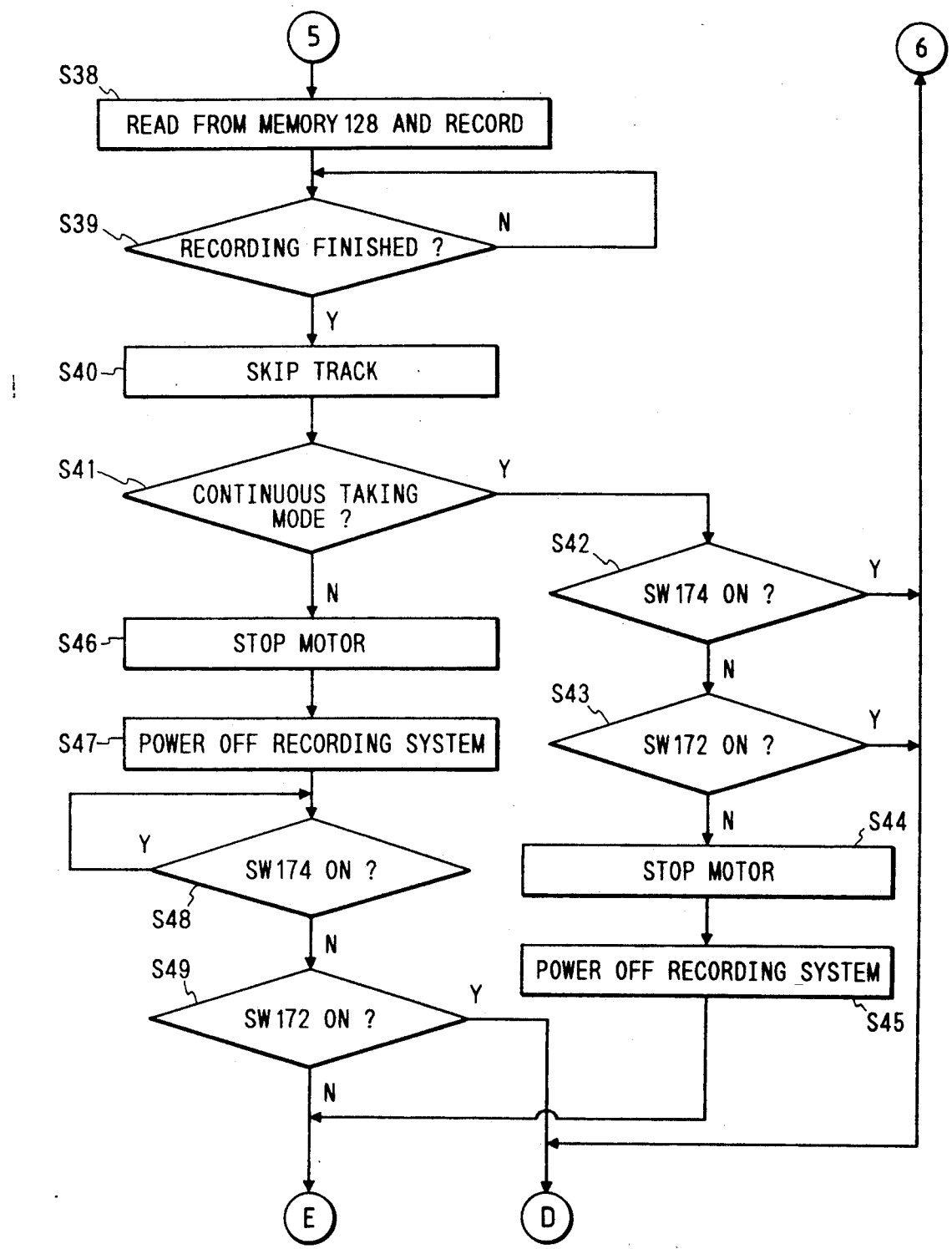

After the magnetic head 144 is moved to an unrecorded track (S5), a timer is set for monitoring the state of the switch 172 (S6), then the timer interruption procedure is enabled (S7) and the sequence enters a standby mode (or sleep mode) of low power consumption. In the present embodiment, during said standby mode, the power supply is conducted only to the timer for monitoring the switch 172 and on circuits to be activated from the interruption by said timer. The power saving can also be achieved by activating the system control circuit 164 by an external interruption when the switch 172 is closed. Thereafter a control sequence shown in FIG. 11 is executed.

The state of the switch 172 is monitored at a given interval (S8), and the sleep state is assumed again if said switch 172 is open, but, if it is closed, the sequence immediately enters the phototaking and recording process. At first the timer interruption is inhibited (S9), then electric power is supplied to the circuits required for image signal processing (namely image pickup device 114; S/H circuits 118R, 118G, 118B; clamp circuits 120R, 120G, 120B; A/D converters 122R, 122G, 122B; MPX 124; DSP 126; and SSG 162) (S10), and the DSP 126 and the SSG 162 are set in the light metering mode (S11). In this state the electric power is not supplied to the memory 128, recording system (D/A converters 130Y, 130C, LPF 132Y, 132C; adder 134; modulating circuits 136Y, 136C; adder 138 and recording amplifier 140), and disk driving system (head moving device 148; spindle motor 152 and servo circuit 154). There are conducted the measurement of the object brightness and the estimation of color of light source illuminating the object, based on the color of said object, only utilizing the image pickup device 114; S/H circuits 118R, 118G, 118B; clamp circuits 120R, 120G, 120B; A/D converters 122R, 122G, 122B; MPX 124 and DSP 126.

The measurement of object brightness can be conducted by sample-holding, clamping and A/D converting the output image of the image pickup device 114 and integrating said output over a necessary area in the DSP 126. The integration over the entire effective image area provides average light metering, or over a central area of the image frame provides center-weighted light metering. This method is advantageous in that it is applicable to any image pickup device or any imaging tube, but all the image signal may have to be read from the image pickup device. However, an X-Y addressible device, such as a MOS image sensor, can reduce the time required for light metering since the data can only be read from the necessary area.

The system control circuit 164 receives the integrated value (or average value) from the DSP 126, and, if said value is not at an appropriate level at the approximate center of the dynamic range of the system (including a case in which the object is too dark to measure)(S12, S13), the diaphragm 112 is closed or opened or the charge accumulating time of the device 114 is varied to reach a suitable level (S14–S17, S18–S21). If the object brightness is too high even after the regulation of the diaphragm 112 and of the charge accumulating time of the image pickup device 114 (S16), a warning for high brightness is displayed (S22). On the other hand, in case of low brightness (S20), a warning for low brightness is displayed (S23).

After the determination of a diaphragm stop value and an exposure time charge accumulating time) suitable for the object brightness, the color of the light source illuminating the object is estimated. The DSP 126 and the SSG 162 are set in the color measuring mode, and the color of the object image is corrected according to the measured color (S25). Such color measurement and correction can be achieved in various manners. As an example, they can be achieved by extracting an area of highest brightness, excluding the saturated areas, from the image signal of the appropriate level, and, assuming that said area of highest brightness is white, correcting the colors in such a manner that said area appears white (more specifically by varying the gains of the R signal system and B signal system, or, as disclosed in the Japanese Laid-open Patent Hei 1-256816, varying the reference voltage at the A/D conversion). The correction coefficients (gains of the R and B signal systems) for obtaining white color in the area estimated as white can be obtained, for example, by gradually varying said coefficients until the color difference signals after correction in the area estimated as white fall below a predetermined level, or by direct determination of said coefficients from the levels of the color difference signals, or corrections of the R and B signals systems by small amounts in such a manner that the integrated values of plural color difference signals (for example R-Y and B-Y) over the entire image area become mutually equal.

Figure 13:
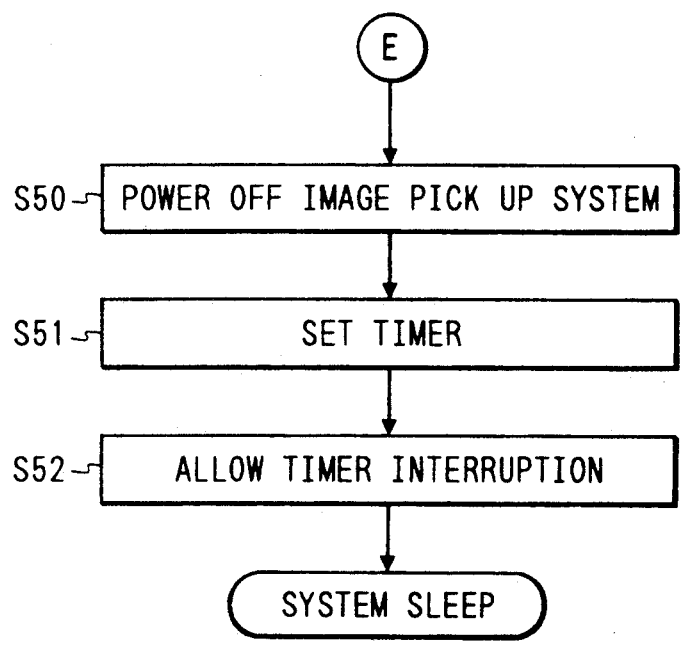

When the switch 172 is turned off (S26), the sequence proceeds to a flow shown in FIG. 13. Since the phototaking operation is suspended, the power supply to the phototaking system (image pickup device 114; S/H circuits 118R, 118G, 118B; clamp circuits 120R, 120G, 120B; A/D converters 122R, 122G, 122B; MPX 124; DSP 126 and SSG 126) (S50) is stopped, then the timer is reset (S51), the timer interruption is enabled and a next interruption is awaited (S52). The above-explained light metering and color measurement are repeated while the switch 172 is closed but the switch 174 is open (S27).

When the shutter release button is fully depressed to close the switch 174 (S27), it determined whether the magnetic disk 146 is in constant rotation (S28), and, if not, the spindle motor 152 is activated (S29). If the memory 128 is not powered, power supply thereto is started (S30, S31). Discriminations of rotation (S28) and of power supply to the memory 128 (S30) are conducted for continuous phototaking operations, and, in the single frame phototaking operation, the activation of the spindle motor 152 and the energization of the memory 128 are always conducted for each frame. Then, the SSG 162 and the DSP 126 are shifted to the recording mode (S32). Thus, the preparation is made for storing the electrical signal from the image pickup device 114 into the memory 128.

The image pickup device 114 is cleared to eliminate the unnecessary charge accumulated in the photoelectric conversion unit (S33). In the present embodiment not employing an optical (mechanical) shutter, the exposure starts from the moment of elimination of the unnecessary charge. After the lapse of the charge accumulating time determined in the light metering routine S12–S24 (S34), the image signal is read from the image pickup device 114 and stored in the memory 128 (S35). After the storage of image data of a frame in the memory 128, said image data are read from the memory 128 and stored in the magnetic disk 146. For this purpose, it is determined whether the magnetic disk 146 is in stable rotation with a predetermined speed (S36). For the purpose of electric power saving, the spindle motor 152 may be started after the power supply to the image pickup system is terminated.

When the magnetic disk 146 reaches stable rotation with the predetermined speed (S36), the recording system (D/A converters 130Y, 130C, LPF's 132Y, 132C, adder 134, modulating circuits 136Y, 136C, adder 138 and recording amplifier 140) is powered (S37). The image data are read from the memory 128, then subjected to gamma correction, knee correction, white balance correction, filtering, conversion from primary color signals to color difference signals etc. in the DSP 126, and supplied to the D/A converters 130Y, 130C in the form of brightness data and line-sequential color difference data. The outputs of the D/A converters 130Y, 130C are subjected to band limitation by the low-pass filters 132Y, 132C. The brightness signal released from the low-pass filter 132Y is added, in the adder 134, with the synchronization signal, and is frequency modulated by the modulating circuit 136Y. The modulating circuit 136C frequency modulates the line-sequential color difference signal from the low pass filter 132C. The outputs of the modulating circuits 136Y, 136C are added by the adder 138, then supplied through the recording amplifier 140 and the switch 142 to the recording head 150 and recorded on the magnetic disk 146 (S38).

Upon completion of the recording on the magnetic disk 146 (S39), the head moving mechanism 148 moves the magnetic head 144 by a track (in case of field recording) or by two tracks (in case of frame recording) (S40).

The phototaking (and recording) operation of a frame is completed in the above-explained procedure. In the following is the preparation for the next phototaking operation will be explained.

In the case of the continuous phototaking mode (S41), as long as the switch 172 or 174 is closed (S42, S43), the light metering (S11 and subsequent steps) and the color measurement (S25) are conducted. If the switches 172, 174 are both off (S43), the spindle motor 152 is stopped (S44), then the power supply to the recording system (S45) and to the image pickup system (S50) is terminated, the timer is reset (S51) and the timer interruption is enabled to await the next interruption (S52).

If the continuous phototaking mode is not assumed (S41), the spindle motor 152 is stopped (S46), and the power supply to the recording system is terminated (S47). If the switch 172 is still on after the switch 174 is turned off (S48, S49), the light metering (S11 and subsequent steps) and the color measurement (S25) are conducted again for the next phototaking operation. When the switch 172 is turned off (S49), the power supply to the phototaking system is terminated (S50), the timer is reset (S51) and the timer interruption is enabled to await the next interruption (S52).

In the following the operation in the reproducing mode will be explained. When the reproduction mode is selected by an unrepresented mode switch (S3), the system control circuit 164 initializes the system corresponding to said mode (S60), and connects the switches 116R, 116G, 116B to the contacts P (S60). Then the SSG 162 is powered and set at the reproduction mode (S61), and the spindle motor 152 is started (S62). When the magnetic disk 146 reaches stable rotation at a predetermined speed (S63), the power supply is started to the reproduction system (reproducing amplifier 156, band-pass filter 158Y, low-pass filter 158C, demodulating circuits 160Y, 160C, S/H circuits 118R, 118G, 118B, clamp circuits 120R, 120G, 120B, A/D converters 122R, 122G, 122B, MPX 124, DSP 126, memory 128, D/A converters 130Y, 130C, LPF's 132Y, and 132C) (S64). The SSG 162 is powered at first because it has to send the reference signal to the servo circuit 154 for controlling the rotation of the spindle motor 152.

The DSP 126 is set at the reproduction mode, and the output of the magnetic head 144 is subjected to a reproduction process (S65). More specifically, said output is supplied, through the switch 42 and the reproducing amplifier 156, to the BPF 158Y and the LPF 158C for separation into a modulated brightness signal and modulated color difference signals, which are respectively demodulated by the demodulating circuits 160Y, 160C. The brightness signal demodulated by the demodulating circuit 160Y is supplied, through the switches 116R, 116G, S/H circuits 118R, 118G and clamp circuits 120R, 120G, to the A/D converters 122R, 122G and digitized therein. Also, the line-sequential color difference signals demodulated by the demodulating circuit 160C are supplied, through the switch 116B, S/H circuit 118B and clamp circuit 120B, to the A/D converter 122B and digitized therein.

The outputs of the D/A converters 122R, 122G, 122B are multiplexed by the MPX 124, and are stored in the memory 128 through the DSP 126. The image data stored in the memory 128 are subjected to interpolation, compensation of lacking signals, filtering etc. and are supplied from the DSP 126 to the D/A converters 130Y, 130C in the form of a brightness signal, containing a composite synchronization signal, and chroma signals. The LPF's 132Y, 132C eliminate the unnecessary band components from the analog outputs of the D/A converters 130Y, 130C. The adder 168 synthesizes the brightness signal and the chroma signals and sends the obtained composite signal to the monitor unit 170, wherein the reproduced image is displayed thereon (S65).

The spindle motor 152 has to continue rotation until the signal of a field or a frame is reproduced from the magnetic disk 146 and stored in the memory 128, but the power consumption can be reduced by terminating the power supply to the spindle motor 152 and the reproducing amplifier 156 after said signal storage in the memory 128. However, if the spindle motor 152 is stopped at each track advancement in case of successive head moving operations, the response of head movement becomes too slow.

The present embodiment adopts the following sequence in order to prevent the above-mentioned drawback. When the track advancement is initiated (S66), track advancement is conducted regardless of whether the signal storage into the memory 128 is completed or not (S67), and the reproduction process is repeated (S65). If the track advancement is not initiated, a timer (different from the timer for monitoring the switch 172 in the recording mode) is initialized until the completion of signal storage into the memory 128 (S69), and, if the signal storage into the memory 128 is completed without the instruction for track advancement (S68), the state of the timer started in the step S69 is monitored (S70). If the track advancement is initiated before the timer overflows (S66), the track advancement is conducted (S67) and the reproduction process is conducted again (S65). If the timer overflows (S70), the spindle motor 152 is stopped and the power supply to the reproducing amplifier 156, BPF 158Y, LPF 158C, demodulating circuits 160Y, 160C, S/H circuits 118R, 118G, 118B, clamp circuits 120R, 120G, 120B, A/D converters 122R, 122G, 122B and MPX 124 is terminated (S71).

It is thus rendered possible to improve the response of track advancement, while reducing the power consumption. If the track advancement is again initiated after the step S71 (S72), the spindle motor 152 is started (S75), and, after the magnetic disk 146 reaches stable rotating speed (S76), the track advancement is conducted (S77). Thereafter the reproduction system is powered (S78).

The re-start of the power supply to the reproducing system is delayed from the start of the spindle motor (S75) or the track advancement (S76) because of the following reason. Until such mechanical operations are completed and the mechanisms are stabilized, the reproducing system is unable to provide a stable reproduction signal even if it is powered. Consequently, until a stable reproduction signal is obtained, the image memorized in the memory 128 is better in that it is free from noises and does not give an unpleasant impression to the observer.

After the reproducing system, from the reproducing amplifier 156 to the MPX 124 is powered (S78), and the sequence returns to the step S65 to repeat the reproduction process.

On the other hand, if the unrepresented main switch is turned off (S73) while the track advancement instruction is awaited after the stopping of the spindle motor 152 (S72, S73), the power supply to the DSP 126, memory 128, D/A converters 130Y, 130C and LPF's 132Y, 132C is interrupted and the sequence is terminated (S74).

In the present embodiment, the processes of interpolation, filtering, color difference signal formation etc. are conducted after the reproduced and demodulated signal or the output signal of the image pickup device 114 is stored in the memory 128, but these processes may naturally be conducted before the storage in the memory 128. It is also possible to again store the processed signal, or to effect addition or subtraction between the stored data of the memory 128 and the processed data.

In the foregoing there has been explained the basic operation of the present embodiment, in the following there will be explained, in detail, the features of the present embodiment.

At first there will be explained the method of loading the output of the image pickup device 114 into the DSP 126 in the recording mode, with reference to FIG. 14. It is assumed that said image pickup device 114 provides separate outputs R, G and B of the same phase. The arrangement of pixels and the phase relationship of the output signals thereof are shown in FIG. 15. In comparison with the ordinary image sensor device of the same number of pixels in which the signal readout is conducted in every other row, the pixel arrangement shown in FIG. 15 allows an interlaced frame image consisting of field images of high resolution to be obtained, by reading all the pixels as illustrated in each field. Since there are three outputs, the bandwidth per output can be reduced to $\frac{1}{3}$. Also, since three outputs are of the same phase, a readout clock pulse can be used for the pixels of these outputs, so that there can be achieved reduction in the number of terminals of the image pickup device, and a looser chip design rule of said device.

Figure 14:
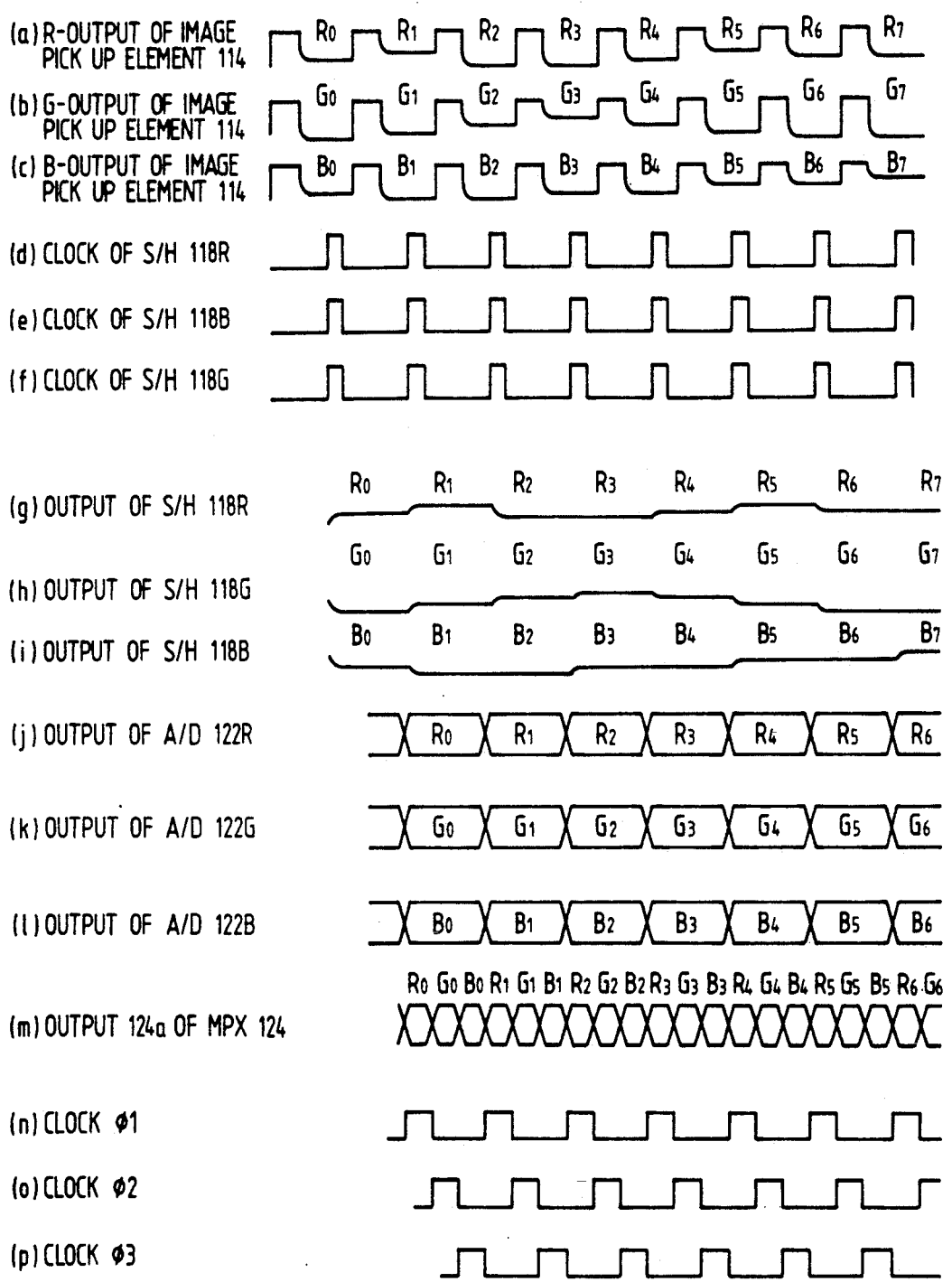
FIG. 14 is a timing chart of signals of the embodiment shown in FIG. 8.
Figure 15:
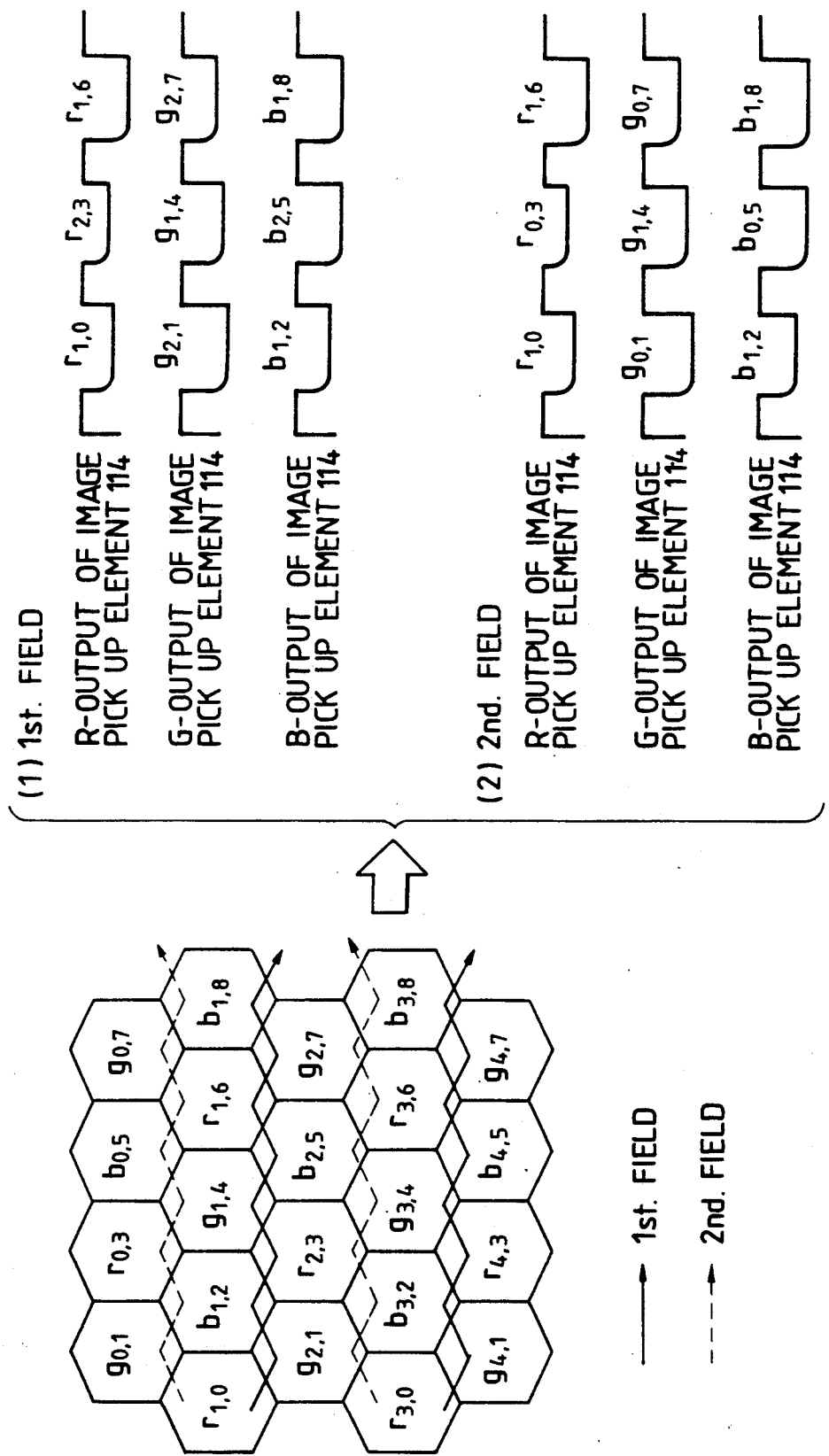
FIG. 15 is a view showing the arrangement of pixels of an image pickup device 14 shown in FIG. 8 and the signals readout therefrom.

The R, G and B outputs of such an image pickup device are obtained, as shown by (a), (b) and (c) in FIG. 14, as signals assuming voltages proportional to the charges accumulated in the pixels after reset pulses of the same phase. In FIG. 14, (d), (e) and (f) indicate sample-hold clock pulses for the S/H circuits 118R, 118G, 118B, which effect sampling in the H-level state of said pulse, and holding in the L-level state of said pulse. R, G and B signals free from reset pulses are obtained, as shown by (g), (h) and (i) in FIG. 14, by said S/H circuits 118R, 118G, 118B. Clamp circuits 120R, 120G, 120B fix the DC level of the outputs of the S/H circuits 118R, 118G, 118B. In the present embodiment, the clamp circuits 120R, 120G, 120B fix the signal level of the light-shielded portion of the image pickup device 114 as the black level, by an optical black level clamping pulse supplied from the SSG 162.

The A/D converters 122R, 122G, 122B convert the outputs of the clamp circuits 120R, 120G, 120B into digital signals. In FIG. 14, (j), (k) and (l) indicate the outputs of the A/D converters 122R, 122G, 122B. As shown in these charts, the A/D conversion is completed within an interval of sampling clock pulses. Certain A/D converters have an A/D conversion time longer than the maximum sampling interval, but such A/D converters merely expand the time difference of the pixels from (g), (h), (i) to (j), (k) (1) without any practical problem. However, in the designing of the SSG 162, it is naturally necessary to consider the phase difference between the readout clock from the image pickup device 114 and the signal processing clock pulse in the DSP 126.

Figure 16:
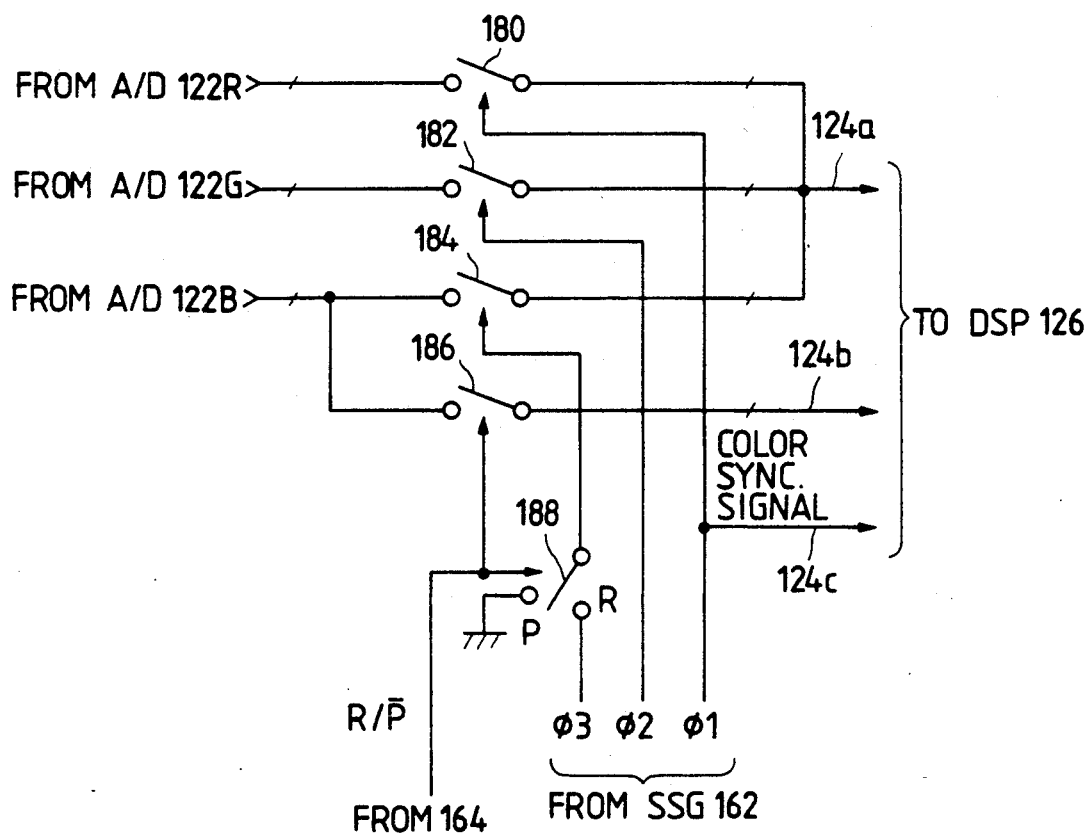
FIG. 16 is a circuit diagram showing an example of a multiplexer 24.

The MPX 124 effects time-axis multiplexing of the outputs of the A/D converters 122R, 122G, 122B. FIG. 16 is a block diagram showing an example of the internal structure of the MPX 124. Switches 180, 182, 184 are respectively closed by the H-level state of clock signals, $\phi 1$, $\phi 2$, $\phi 3$ from the SSG 162. Switches 186, 188 are shifted from a control signal from the system control circuit 164, for varying the function of the MPX 124 in the recording mode and in the reproduction mode. In the recording mode, the switch 186 is open while the switch 188 connects the clock signal $\phi 3$ to the control terminal of the switch 184. In the reproduction mode, the switch 186 is closed, while the switch 188 does not send the clock signal $\phi 3$ to the control terminal of the switch 184, which thus remains always open. It is also possible to eliminate the switch 188, and to control the switch 186 only by the system control circuit 164 in the reproduction mode, or, in the recording mode, to fix the output clock signal $\phi 3$ of the SSG 162 at the L-level state, thereby turning off the switch 184. In this manner the delay of the clock signal $\phi 3$ by the switch 188 can be prevented.

In response to the clock signals shown by (n), (o), (p) in FIG. 14, the MPX 124 releases a signal 124a obtained by time-axis multiplexing of the outputs of the A/D converters 122R, 122G, 122B, as shown by (m) in FIG. 14. In order to inform the DSP 126 of the output timing of said A/D converters, the clock signal $\phi 1$ is supplied, as a color synchronization signal 124c, to the DSP 126. The freedom in the designing of distance between the MPX 124 and the DSP 126 is increased by maintaining the characteristics (particularly delay time) of the transmission path for the color synchronization signal 124c as close as possible to those of the transmission path for the signal 124a. This fact signifies that a circuit block of the A/D converters involving analog circuits can be divided from a circuit block of the DSP involving high-speed digital processing circuits. Consequently there are obtained advantages of forming systems of difference functions by combining DSP's of different functions with the same A/D conversion block, and improving noise resistance by separating the analog unit and the digital unit.

Figure 18:
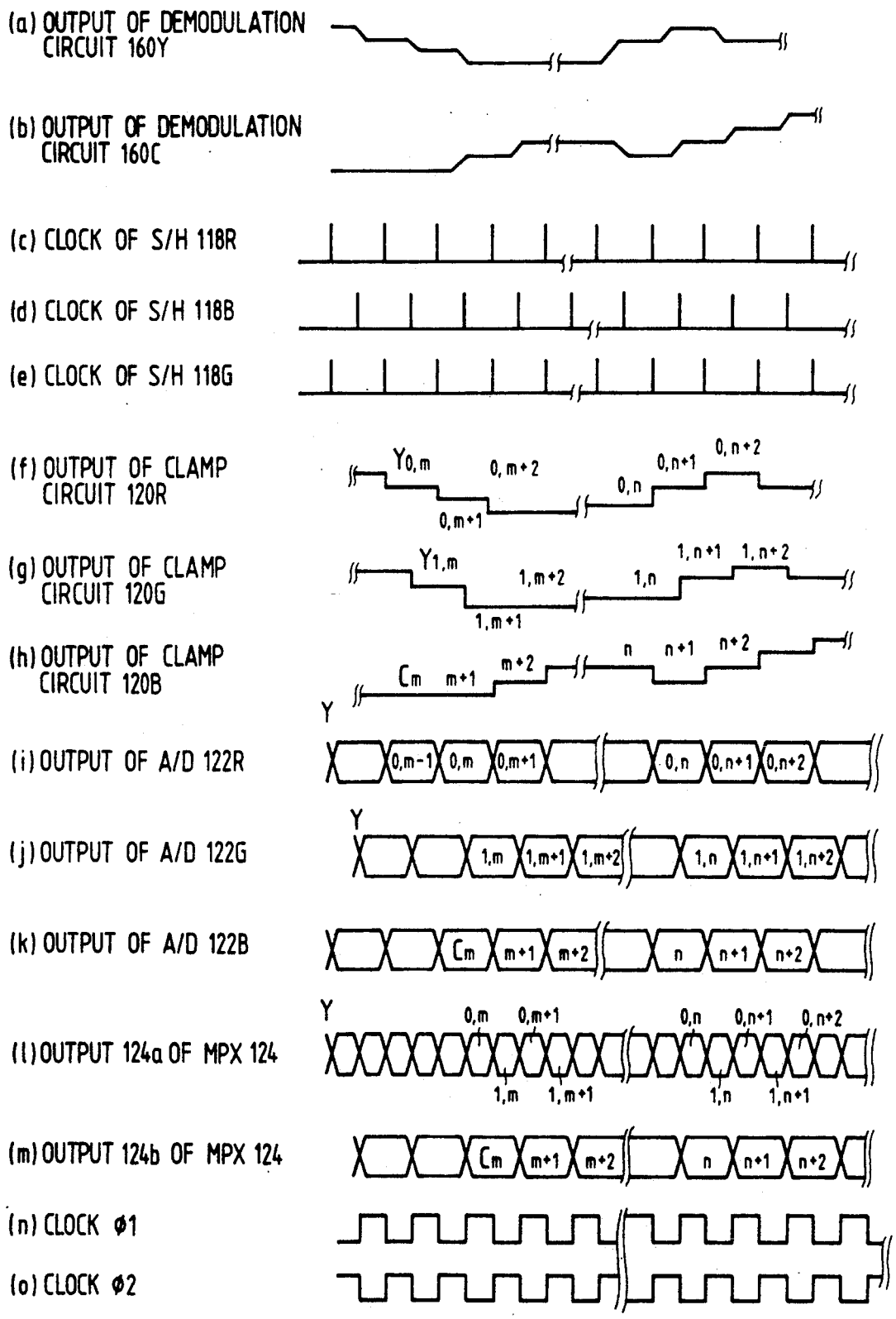

Now, reference is made to FIGS. 17 and 18 for explaining the method of loading the reproduced brightness signal and line-sequential color difference signals into the DSP 126. In FIGS. 17 and 18, (a) indicates the brightness signal involving the composite synchronization signal, released from the demodulating circuit 160Y, while (b) indicates the line-sequential color difference signal released from the demodulating circuit 60C. The S/H circuits 118R, 118G effects sample holding on the brightness signal by samplehold pulses shown in (c), (d) in FIGS. 17 and 18, and the S/H circuit 118B effects sample-holding of the line-sequential color difference signals shown in (e) in FIGS. 17 and 18. Said S/H circuits 118R, 118G, 118B effects the sampling or holding on the input signal respectively in the H- or L-level state of the sample hold pulses in (c), (d), (e) in FIGS. 17 and 18.

The difference from the recording mode lies the fact that the sample hold pulse (c) for the S/H circuit 118R is different by 180° in phase from the sample hold pulse (d) for the S/H circuit 118G.

The clamp circuits 120R, 120G clamp the output (brightness signal) from the S/H circuits 118R, 118G at the sync tip level, while the clamp circuit 120B clamps the output (line-sequential color difference signals) from the S/H circuit 118B, once in every two H periods, at the pedestal level. The outputs of the clamp circuits 120R, 120G, 120B are shown in (f), (g), (h) in FIGS. 17 and 18. The A/D converters 122R, 122G, 122B respectively digitize the outputs of the clamp circuits 120R, 120G, 120B for supply to the MPX 124. Said outputs are shown in (i), (j), (k) in FIGS. 17 and 18. The A/D conversion time coincides with the sampling interval, but this fact merely expands the time difference between (f), (g), (h) and (i), (j), (k) in FIGS. 17 and 18 without any practical problem as in the recording mode. Naturally, in the designing of the SSG 162 and the DSP 126, said time difference has to be taken into consideration.

The MPX 124 effects time-axis multi-plexing of the outputs of the A/D converters 122R, 122G, 122B to release a signal (1), in FIGS. 17 and 18, as a first output 124a, and a signal (m) as a second output 124b. Now, reference is made to FIG. 16 for explaining the function of the MPX 124. In the reproduction mode, the switch 186 is closed while the switch 188 is connected to the contact P, by a control signal from the system control circuit 164. By said connection of the switch 188 to the contact P, the clock signal $\phi 3$ from the SSG 162 is unable to control the switch 184, which therefore remains constantly open. The switches 180, 182 are opened or closed respectively in the H- or L-level state of the clock signals $\phi 1$, $\phi 2$ in (n), (o) in FIGS. 17 and 18. Thus, the output 24a of the MPX 124 alternately releases the outputs of the A/D converters 122R and 122G, while the output 124b releases the output signal of the A/D converter 122B. Thus, the MPX 124 releases the digital brightness signal and the digital line-sequential color difference signals respectively from the output terminals 124a, 124b.

Figure 19:
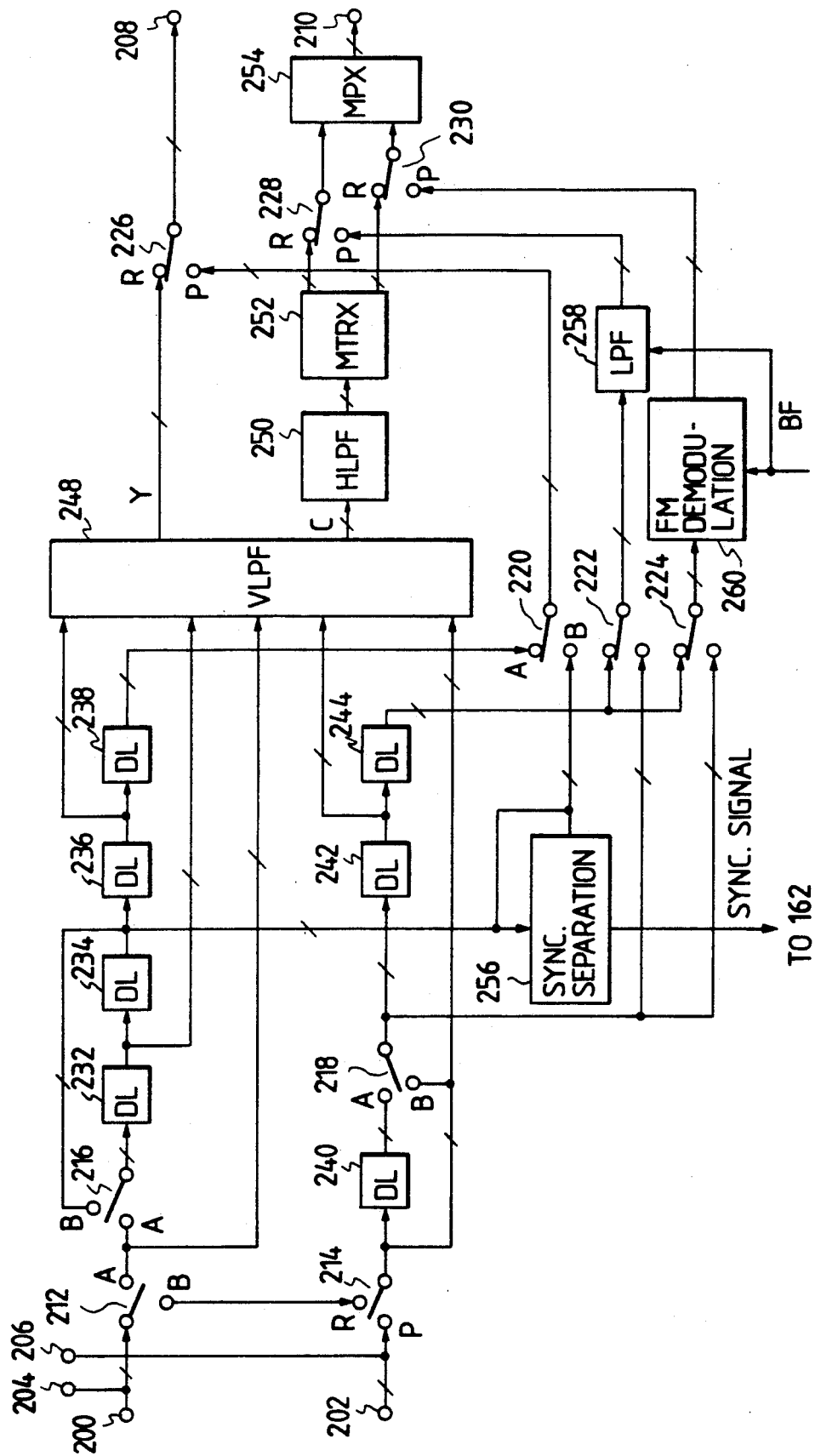
FIG. 19 is a block diagram of a digital signal processor 26 for image processing at recording and reproduction.

In the following the function in the DSP 126 will be briefly explained. FIG. 19 is a block diagram of the DSP 126, wherein, input terminals 200, 202 are provided for respectively receiving the outputs 124a, 124b of the MPX 124. In the recording mode, the input terminal 200 alone receives the R, G, B data. In the reproduction mode, the input terminal 200 receives the brightness data including the composite synchronization signal, while the input terminal 202 receives the line-sequential color difference data. An input/output terminal 204 sends the data, received at the input terminal 200, to the memory 128 and receives data read therefrom, and an input/output terminal 206 sends the data, received at the input terminal 202, to the memory 128 and receives data read therefrom.

An output terminal 208 sends the processed data to the D/A converter 130Y, and an output terminal 210 sends the processed data to the D/A converter 130C. In the recording mode, the output terminal 208 releases the brightness data including the composite synchronization signal, while the output terminal 210 releases the line-sequential color difference data. In the reproduction mode, the output terminal 208 releases the brightness data including the composite synchronization signal, while the output terminal 210 release color sub-carrier data modulated with two color difference signals.

There are further provided switches 214, 216, 218, 220, 224, 226, 228, 230; delay lines 232, 234, 236, 238, 240, 242, 244; a vertical low-pass filter (VLPF) 248 for eliminating high frequency components in the vertical direction of the spatial frequencies utilizing data of plural scanning lines; a horizontal low-pass filter (HLPF) 250 for eliminating high frequency components in the horizontal direction of the spatial frequencies; a matrix circuit 252 for obtaining color difference signals from color signals; a multiplexer 254 for multiplexing two color difference signals line-sequentially or dot-sequentially; a synchronization separation circuit 256 for separating horizontal and vertical synchronization signals from the brightness signal containing the composite synchronization signal in the reproduction operation; and burst flag adding circuits 258, 260.

The amount of delay introduced by the delay line 232, by the delay lines 234 and 236, and by the delay lines 240 and 242 corresponds to 1 H period in the phototaking operation; that introduced by the delay lines 232 and 234 corresponds to 1 H period of the brightness signal in the reproducing operation; that introduced by the delay lines 236 and 238 corresponds to 0.5 H period of the brightness signal in the reproducing operation; that introduced by the delay line 240 corresponds to 0.5 H period of the color difference signal in the reproducing operation; and that introduced by the delay lines 242, 244 corresponds to 1 H period of the color difference signal in the reproducing operation. The 1 H period in the phototaking operation corresponds, in the pixel arrangement shown in FIG. 15, to the row having a same first suffix. Thus, the amount of processed data is ½ of the data read in a horizontal scanning period.

Signal lines for clock pulses for operation, synchronization and control are omitted as they are unnecessary in the description. Signal lines with diagonal lines "/" have a bus structure.

In the following there will be explained, with reference to FIG. 19, the filtering and color difference matrix process in the phototaking operation, and the signal compensation and simultaneous signal formation from the line-sequential signal.

In the phototaking mode, the switches 214, 226, 228 and 230 are connected to the contacts R while the switch 218 is connected to the contact A. The switch 212 is shifted by the color synchronization signal 124c the MPX 124 and the basic function clock signal from the DSP 126 and distributes the R, G, B color signals, in the order as shown in FIGS. 14 and 15, to each scanning line (row of said first suffix) shown in FIG. 15. Also, in case of once storing the output of the MPX 124 in the memory 128 and then reading the data from said memory 128, the same effect can be obtained by fixing the write-in address for the memory 128 at a certain phase of the color synchronization signal 124c.

By operating the switch 212 for 3 horizontal scanning periods (or 6 scanning lines if a row with a same first suffix in the pixel arrangement in FIG. 11 is considered as a scanning line), the VLPF 248 receives, in parallel manner, the signals of 5 scanning lines in which a row of a same first suffix is considered as a scanning line. The VLPF 248 multiplies the input 5 scanning lines respectively by suitable coefficients and then adds the results, thereby realizing a low-pass characteristic in the vertical direction. The vertical filtering characteristic can be varied for the brightness signal and the color difference signals by the use of two sets of coefficients. It is also possible to conduct so-called aperture correction for the brightness signal by detecting an edge from the difference of signals of adjacent scanning lines.

The brightness signal processed in the VLPF 248 is supplied, through the switch 226 and the output terminal 208, to the D/A converter 130Y. The color difference signals processed in the VLPF 248 are subjected to bandwidth limitation in the horizontal direction by the HLPF 250. In the television signal, the color difference signals do not require as much data as the brightness signal since the bandwidth of the color difference signals is narrower than that of the brightness signal. Thus, the output of the VLPF 248 has to be skipped because the data amount is too large. However, since a simple skipping generates a folding distortion, the bandwidth limitation is applied by the HLPF 250. Though not shown in FIG. 19, the skipping is conducted prior to the entry into the matrix circuit 252.

The matrix circuit 252 forms two color difference signals R-Y, B-Y from the output of the HLPF 250. The multiplexer 254 alternately selects the color difference signals R-Y, B-Y from the matrix circuit 252 every horizontal scanning period, thereby forming the line-sequential color difference signal and sending it to the output terminal 210.

The above-explained process forms, from the R, G, B signals entered from the input terminal 200, a brightness signal not containing the synchronization signal and a line-sequential color difference signal, which are respectively released from the output terminals 208, 210.

In the following the operation in the reproduction mode will be explained. In said mode, the switches 214, 226, 228 and 230 are constantly connected to the contacts P, while the switch 212 is constantly connected to the contact A. The input terminal 200 receives the brightness signal containing the composite synchronization signal, while the input terminal 202 receives the line-sequential color difference signal. The delay lines 232, 234 and the switch 216 constitute a dropout compensation circuit for compensating the dropout in the signal by utilizing the correlation of the brightness signal between the scanning lines. In the presence of a dropout, the switch 216 is connected to the contact B whereby the signal of a preceding line (output of the delay line 234) is supplied again to the delay line 232. The synchronization separation circuit 250 separates the synchronization signal from the compensated signal, and the separated synchronization signal is supplied to the SSG 162.

A circuit consisting of the delay lines 236, 238 and the switch 220 and a circuit consisting of the delay line 240 and the switch 218 constitute a skew compensating circuit for skew compensation at the reproduction of a field recorded image. The skew compensation is merely to apply a delay of 0.5 H period to the brightness signal and the color difference signal, and will not be explained in detail.

The delay lines 242, 244 and the switches 222, 224 constitute a circuit for converting the line-sequential signal into a line-simultaneous signal. This can be achieved by shifting the switches 222, 224 by every horizontal scanning line. The burst flag adding circuits 258, 260 add burst flags to the simultaneous color difference signals. A coverage over a wide hue range is rendered possible by rendering the level of the added burst flags variable in the positive and negative ranges independently for the color difference signals R-Y and B-Y. The color difference signals with the burst flags added by the adding circuits 258, 260 are supplied, through the switches 228, 230, to the multiplexer 254 for time-axis multiplexing to obtain a dot-sequential color difference signal.

In case of forming the NTSC television signal, the sampling rate for the color difference signal R-Y, B-Y is selected as twice that of the color sub-carrier frequency, and the sampling phases therefor are displaced by 180°. Also, polarity of each of the color difference signals R-Y and B-Y is inverted in every other line in the multiplexer 254. In this manner the output of said multiplexer 254 can be subjected to D/A conversion as a 1-channel chroma signal and can be superposed with the brightness signal. FIGS. 8 and 19 illustrate such structure.

The multiplexer 254 is provided for reducing the number of output terminals of the DSP 126, but is not an essential component in the signal processing, for example in the formation of various standardized television signals. Such reduction in the number of output terminals is advantageous in chip designing and in circuit board preparation, since a digital circuit such as the DSP 126 requires plural terminals (usually 6 to 10 bits) for a digital output signal.

In the circuit shown in FIG. 19, the data are once stored in the memory 128 and then subjected to processing by the DSP 126 in the course of signal read-out from said memory, but it is naturally possible to store the reproduced signal or the signal from the image pickup device 114 in the memory 128 after desired processing. It is also possible to store the data in the course of processing, in the memory 128. The delay lines 232, 234, 236, 240, 242 and 244 may be dispensed with if the memory 128 has the random access capability.

Figure 20:
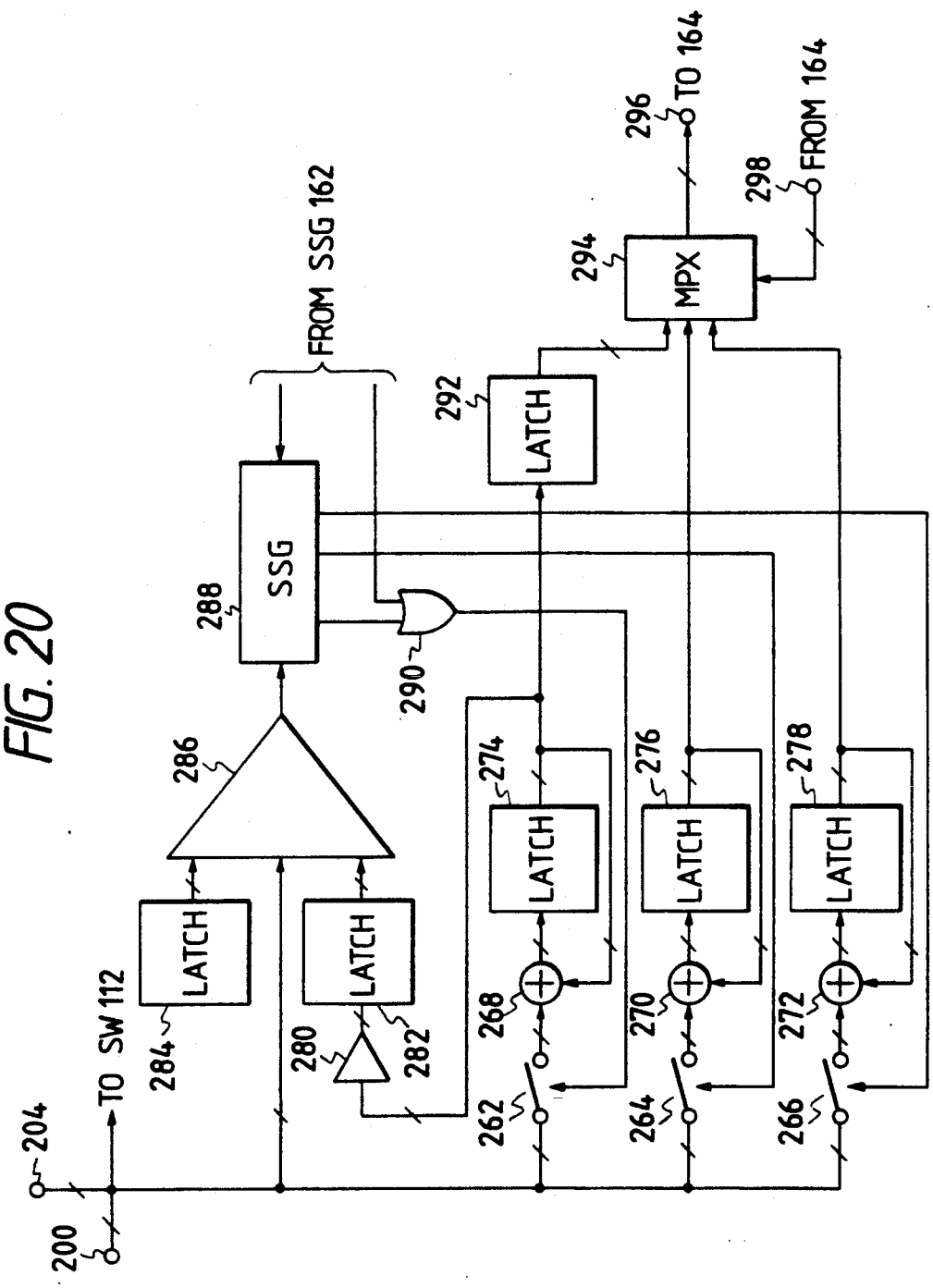
FIG. 20 is a block diagram of a digital signal processor 26 for light metering and color measurement.

In the following there will be explained the measurement of object brightness and the estimation of color of light source, by the DSP 126. FIG. 20 is a circuit block diagram therefor, in which the same components as those in FIG. 19 are represented by the same numbers. There are provided switches 262, 264, 266 for selecting whether or not to fetch the image data for light metering and color measurement; adders 274, 270, 272; and latch circuits 274, 276, 278 for temporarily storing the results of additions by the adders 268, 270, 272. The outputs of the latch circuits 274, 276, 278 are fed back to the adders 268, 270, 272, whereby an integrating circuit is constituted by said adders and latch circuits.

There are also provided a multiplier 280 for multiplying the output of the latch circuit 274 by a predetermined coefficient; a latch circuit 282 for latching the output of the multiplier 280; a latch circuit 284 for holding a fixed value; a window comparator 286 for releasing a signal when the image data of the input terminal 200 are positioned between the data of the latch circuit 284 and those of the latch circuit 286; and an SSG 288 for releasing control signals for the switches 262, 264, 266 in response to the clock signal from the SSG 162 and the output of the window comparator 286. However, the control signal for the switch 262 is supplied to the control terminal thereof, through an OR gate 290, which also receives the clock signal from the SSG 162.

There are further provided a latch circuit 292 for latching the output of the latch circuit 274; a multiplexer 294 for selectively supplying the outputs of the latch circuits 292, 276, 278 to the system control circuit 264 through an output terminal 296; and an input terminal 298 for the control signal from the system control circuit, for controlling said multiplexer 294.

The input terminal 200 receives, as explained before, the dot-sequential R, G, B signals. For measuring the object brightness, the switch 262 is controlled by the light metering clock signal from the SSG 162, thereby integrating all or a part of the image data by the adder 268 and the latch circuit 274. The center-weighted light metering can be achieved by closing the switch 262 in the central area of the image. It is also possible to sample all the colors while reducing the amount of data, by closing the switch 262 at a suitable interval (for example an interval which is not a multiple of 3 for the wave form (m) shown in FIG. 14). However the determination of brightness can also be achieved by simple data skipping followed by integration, without the filtering mentioned above. In this manner the number of bits of the adder 268 and the latch circuit 274 can be reduced.

The result of said integration, held by the latch circuit 274, is transferred to the latch circuit 292 under the control by the system control circuit 164 or the SSG 162, and is sent to the system control circuit 164 through the multiplexer 294 and the output terminal 296. The system control circuit 164 executes the process of steps S12-S23 shown in FIG. 11, according to said result of integration.

Figure 21:
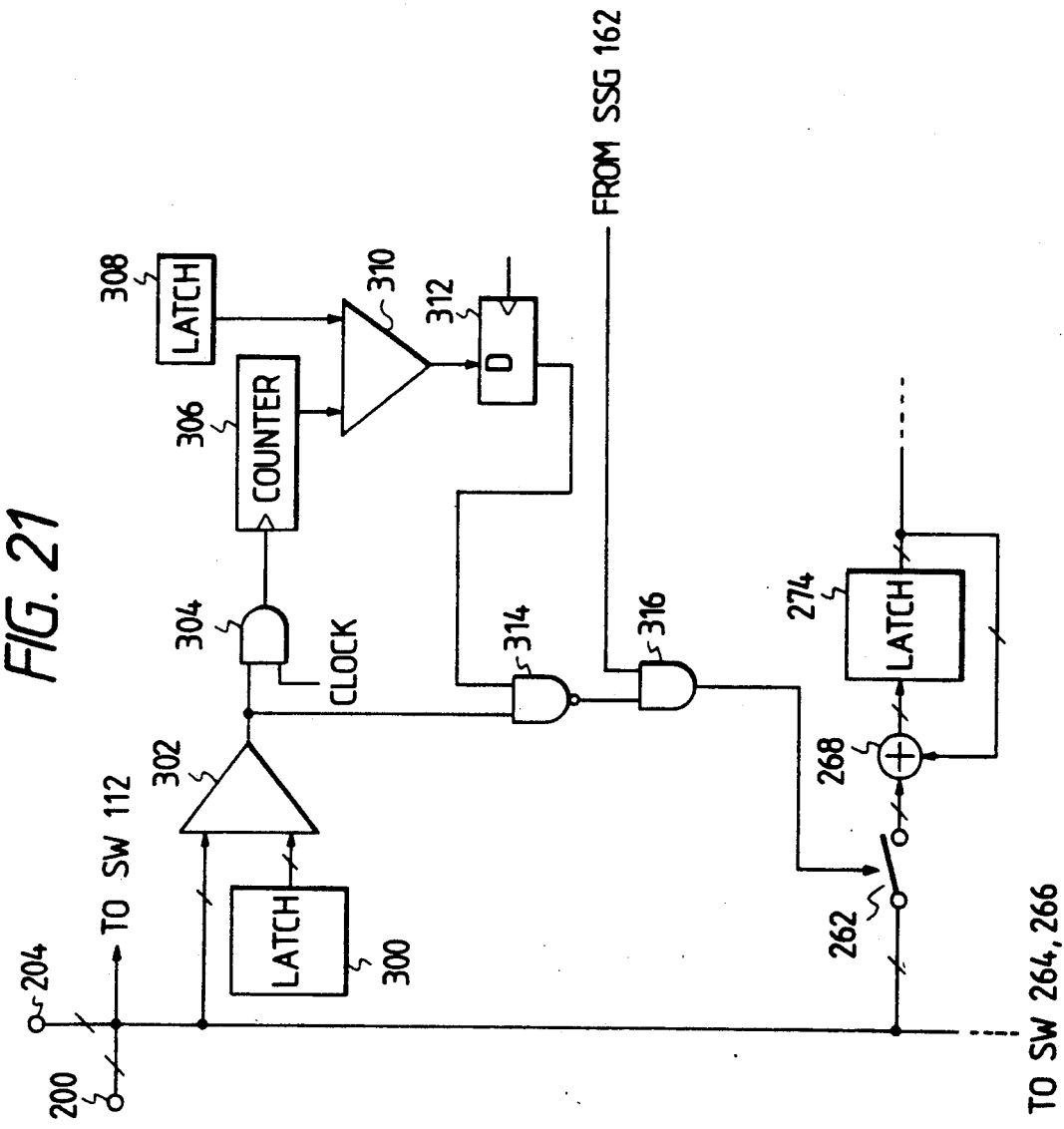
FIG. 21 is a block diagram showing a variation of the circuit shown in FIG. 20.

It is also effective, for reducing the light metering time for obtaining an image signal of an appropriate level or improving the accuracy of light metering, to vary the area of integration or to vary the period of sampling of pixels in the integrated area, according to the number of passings through the loop of the steps S12-S23 in FIG. 11 or according to the phototaking mode (continuous or single frame). For example it is conceivable, in the first light metering in the first frame of the single frame or continuous phototaking operation, to effect coarse sampling in the vicinity of the center, then to expand the integrating area in combination with variations in the diaphragm aperture and in the charge accumulating time in the second light metering, and to reduce the space of the sampled pixels in the same integrating area in the third light metering. In this case it is possible to count the number of saturated pixels in the course of the second integration, and, if said number does not exceed a predetermined proportion in the entire image, to exclude such saturated pixels in the third integration regardless of the integrating area or the sampling interval. This method realizes appropriate exposure in most parts of the object image, unless the image pickup device 114 shows blooming. FIG. 21 shows a variation of the DSP 126 for realizing such a method, wherein the same components as those in FIG. 20 are represented by the same numbers.

Referring to FIG. 21, there are provided a latch circuit 300 for storing the saturated value; a comparator 302 for comparing the image data entered from the input terminal 200 with the output of the latch circuit 300; an AND gate 304 for timing adjustment; a counter 306; a latch circuit 308 for memorizing a reference value of the number of saturated pixels; a comparator 310 for comparing the output of the latch circuit 308 with the count of the counter 308; a D-flip-flop 312; a NAND gate 314; and an AND gate 316.

The comparator 302 compares the image data from the input terminal 200 with a saturation detecting level (output of the latch circuit 300), and releases a signal in case the former is at least equal to the latter. The output of said comparator 302 is supplied, after timing adjustment in the AND gate 304, to the counter 306, which thus counts the number of saturated pixels. The comparator 310 compares the number of saturated pixels counted by the counter 306 with the reference value of the latch circuit 308, and the result of said comparison is supplied to the NAND gate 314 through the flip-flop 312. If the number of saturated pixels is less than the reference value of the latch circuit 308, the flip-flop 312 sends an H-level signal to the NAND gate 314 in the next integrating period.

Said NAND gate 314 also receives the output of the comparator 312. Therefore, if image data exceeding the saturation level are entered from the input terminal 200 while the H-level signal is supplied from the flip-flop 312 to the NAND gate 314, the output thereof is shifted to the L-level state by the output of the comparator 302, whereby the clock signal from the SSG 162 is intercepted by the AND gate 316. Consequently, the switch 262 is turned off, and the integrating operation by the adder 268 and the latch circuit 274 is interrupted.

The circuit portion consisting of the counter 306, latch circuit 308, comparator 310 and flip-flop 312, or the function thereof, may be incorporated in the system control circuit 164.

Again referring to FIG. 20, and when the appropriate exposure is determined as explained above, there is conducted the estimation of the color temperature of the light source illuminating the object.

The integrated values of all or a part of the image signal used for determining the appropriate exposure, retained in the latch circuit 274, are transferred to the latch circuit 292, then multiplied by a predetermined coefficient and averaged in the multiplier 280, and stored in the latch circuit 292. The coefficient used in the multiplier 280 is a product of the number of integrated pixels and the given coefficient for obtaining the average of the integrated image, to be used for determining the average value of each pixel.

The window comparator 286 releases a signal only when the image data from the input terminal 200 are positioned between the output (saturation level) of the latch circuit 284 and the output of the latch circuit 282. During the signal release from the window comparator 286, the SSG 288 controls the switches 262, 264, 266 to distribute the image data from the input terminal 200 to the adders 268, 270, 272 in respective colors. For this purpose, the SSG 288 receives, from the SSG 162, a signal corresponding to the color synchronization signal 124c of the MPS 124.

Thus, the integrated values of respective colors of the unsaturated pixels of high brightness are retained in the latch circuits 274, 276, 278, and are supplied through the multiplexer 294 to the system control circuit 264.

In the foregoing description the primary color signals of three colors are integrated, but it is also possible to provide, in front of the switches 264, 266, a matrix circuit for converting the primary color signals into color difference signals and to integrate said color difference signals.

Figure 22:
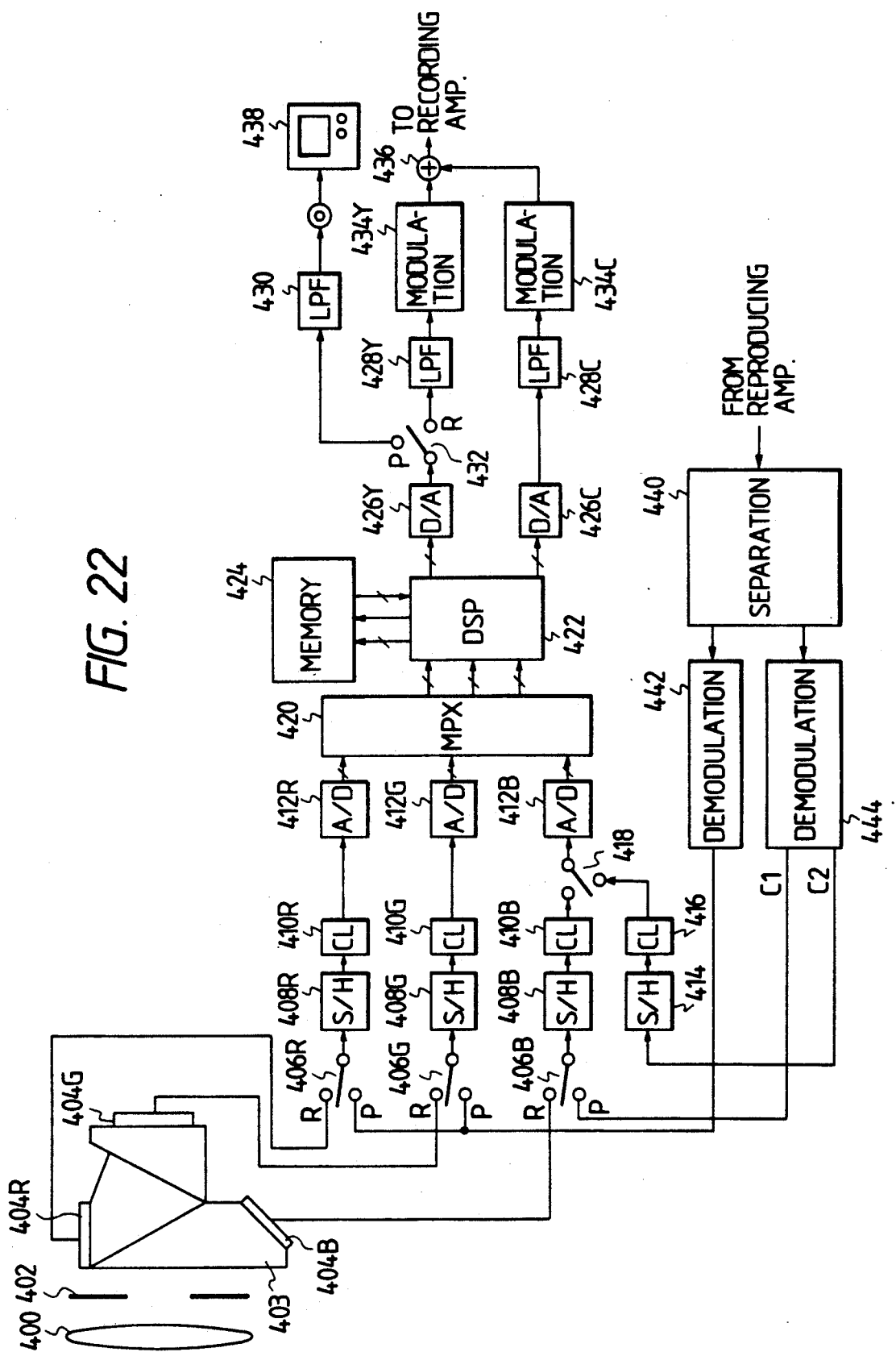
FIG. 22 is a block diagram of a third embodiment.

FIG. 22 is a block diagram of another embodiment of the present invention, wherein the driving system for the magnetic disk, and the circuits from the recording amplifier to the magnetic head and from the magnetic head to the reproducing amplifier are the not illustrated since they are same as those in FIG. 1.

In FIG. 22 there are shown a phototaking lens 400; a diaphragm 402; a dichroic prism 403 for dividing an optical image, formed by the phototaking lens, into three image pickup devices 404R, 404G, 404B which have color filters of R, G, B colors in front thereof; a switch 406R for selecting the output of the image pickup device 404R or a reproduced brightness signal; a switch 406G for selecting the output of the image pickup device 404G or a reproduced brightness signal; and a switch 406B for selecting the output of the image pickup device 406B or a reproduced color difference signal.

There are further provided S/H circuits 408R, 408G, 408B; clamp circuits 410R, 410G, 410B; A/D converters 412R, 412G, 412B; a S/H circuit 414 for sample holding of the other reproduced color difference signal; a clamp circuit 416; a switch 418 for forming a dot-sequential signal from the output of the clamp circuit 410B and that of the clamp circuit 416, for supply to the A/D converter 412B; a multiplexer (MPX) for time-axis multiplexing of the outputs of the A/D converters 412R, 412G, 412B; a digital signal processor (DSP) 422; and a frame memory 424 for storing the image data of a frame under the control of the DSP 422.

There are further provided D/A converters 26Y, 426C for converting the data from the DSP 422 into an analog signal; low-pass filters (LPF) 428Y, 30 for eliminating the sampling carrier resulting from the D/A converter 426Y; a low-pass filter (LPF) 28C for eliminating the sampling carrier resulting from the D/A converter 426C; a switch 432 for supplying the output of the D/A converter 426Y to the LPF 428Y in the recording mode or to the LPF 430 in the reproducing mode; frequency modulating circuits 434Y, 434C; an adder 436 for superposing the outputs of the modulating circuits 434Y and 434C; and a monitor unit 438 receiving the output of the LPF 430. The output of the adder 436 is supplied to a recording amplifier similar to that 140 shown in FIG. 8.

There are further provided a separating circuit 440 for separating the modulated brightness signal and the modulated color difference signal from the output of a reproducing amplifier similar to that 156 shown in FIG. 8; a demodulating circuit 442 for the modulated brightness signal; and a demodulating circuit 444 for demodulating the modulated color difference signal to obtain two color difference signals. An output of the demodulating circuit 444 is supplied to the contact P of the switch 406B, while the other output is supplied to the S/H circuit 414.

There are also provided an SSG corresponding to the SSG 162 and a system control circuit corresponding to the circuit 164, but these are omitted from the illustration.

Figure 23:
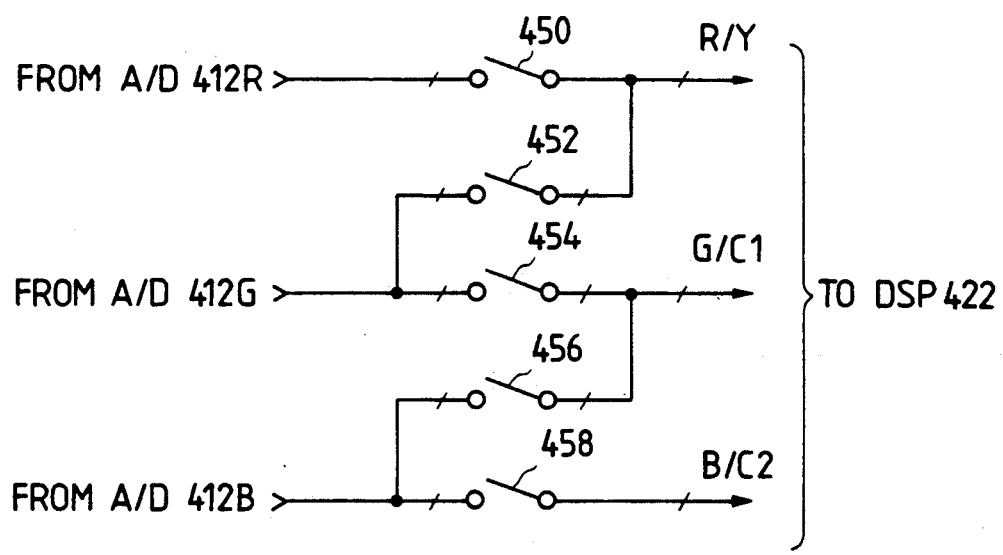
FIG. 23 is a circuit diagram of a multiplexer 420 shown in FIG. 22.

FIG. 23 shows the internal structure of the MPX 420, which is composed of five switches 450, 452, 453, 456, 458 shifted in the recording mode and in the reproduction mode as shown in FIG. 24.

The function in the phototaking (and recording) operation is basically the same as that shown in FIG. 1. The outputs of the image pickup devices 404R, 404G, 404B are supplied, through the switches 406R, 406G, 406B, S/H circuits 408R, 408G, 408B, clamp circuits 410R, 410G, 410B, (also the switch 418 for the output of the clamp circuit 410B), and the A/D converters 412R, 412G, 412B, to the MPX 420. Since the switches 450, 454 and 458 are closed while the switches 452 and 456 are open, the MPX 420 transmits the input signal to the DSP 422 without multiplexing. Absence of multiplexing is desirable in handling a signal of wide band such as that of high definition television. The processing int he DSP 422 can be the same as that in the DSP 126, but it may also be so designed as to internally process non-line-sequential color difference signals. The DSP 422 sends the brightness signal to the D/A converter 426Y and the color difference signals to the D/A converter 426C. The signals are thereafter processed in the same manner as in FIG. 1 and are recorded on a recording medium such as a magnetic disk.

In the following the function in the reproducing mode is explained. The separating circuit 440 separates the output of the reproducing amplifier into a modulated brightness signal and a modulated color difference signal. The demodulating circuit 442 demodulates the modulated brightness signal, and the demodulated brightness signal is supplied, as in FIG. 8, through the switches 406R, 406G, S/H circuits 408R, 408G and clamp circuits 410R, 410G to the D/A converters 412R, 412G, whereby the reproduced and digitized brightness signal is supplied to the MPX 420. Also, the demodulating circuit 444 demodulates the modulated color difference signal to generate two color difference signals C1, C2, of which the first one C1 is processed by the switch 406B, S/H circuit 408B and clamp circuit 408B in the same manner as shown in FIG. 8, while the second one C2 is processed by the S/H circuit 414 and the clamp circuit 416 in the same manner as the first color difference signal C1. The outputs of the clamp circuits 410B, 416 are supplied, in a mutually offset state in time by the switch 418, to the A/D converter 412B, and, after digitization, to the MPX 420.

The MPX 420 converts the signals from the A/D converters 412R, 412G, 412B into the brightness signal of one channel and color difference signals of two channels for supply to the DSP 422. In the MPX 420, the switch 454 alone is turned off, while other switches 450, 452, 456, 458 are turned on and off as shown in FIG. 24.

As shown in FIG. 24, the switches 450 and 452 have the same switching phase while the switches 456 and 458 have the same switching phase. However, between these two groups there is not required the coincidence of phase or the integral ratio of frequencies, and there are only required the phase inversion between the switches 450 and 452 and between the switches 456 and 458. Nevertheless, the relations of phase and frequency as shown in FIG. 24 are naturally advantageous in easy post-processing and in reduced influence of.

The output of the MPX 420 is subjected, in the DSP 422 and the memory 424, to filtering and interpolation, whereby the DSP 422 provides the D/A converter 426Y with the signal of a predetermined television format. The analog television signal obtained by the D/A converter 426Y is supplied, through the switch 432, to the LPF 430 for elimination of the sampling carrier involved in the D/A conversion, and is further supplied to the monitor unit 438 whereby the reproduced image is displayed.

Figure 25:
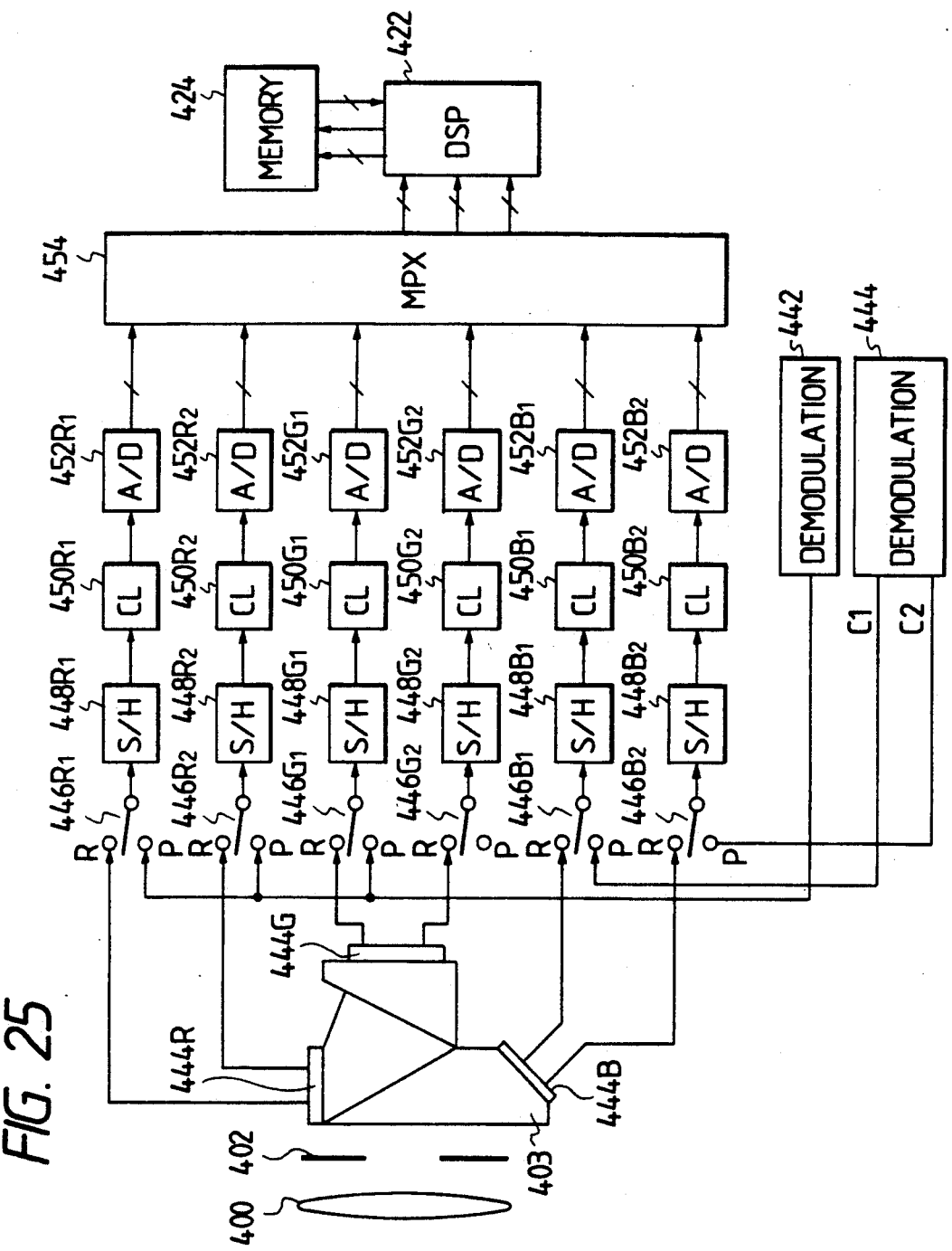
FIG. 25 is a block diagram of a fourth embodiment.

FIG. 25 is a block diagram of a variation of the embodiment shown in FIG. 22. The embodiment shown in FIG. 25 is suitable for processing the image signal of a bandwidth wider than that of the existing television format. In FIG. 25, same components as those in FIG. 22 are represented by same numbers. The embodiment shown in FIG. 25 is different from that shown in FIG. 22 in that each image pickup device has two outputs, the circuit including the S/H circuit clamp circuit and A/D converter is correspondingly provided in two units for each image pickup device, or in six units in total.

There are provided image pickup devices 444R, 444G, 444B each of which has two outputs and which are respectively provided with R, G and B color filters in front thereof; switches $446R_1$, $446R_2$ for selecting the outputs of the image pickup device 444R or the reproduced brightness signal; switches $446G_1$, $446G_2$ for selecting the outputs of the device 444G or the reproduced brightness signal; and switches $446B_1$, $446B_2$ for selecting the outputs of the image pickup device 444B or the reproduced color difference signals C1, C2. However, the reproduced brightness signal is not supplied to the contact P of the switch $446G_2$. There are further provided S/H circuits $448R_1$, $448R_2$, $448G_1$, $448G_2$, $448B_1$, $448B_2$; clamp circuits $450R_1$, $450R_2$, $450G_1$, $450G_2$, $450B_1$, $450B_2$; A/D converters $452R_1$, $452R_2$, $452G_1$, $452G_2$, $452B_1$, $452B_2$; and a multiplexer (MPX) 454.

Figure 26:
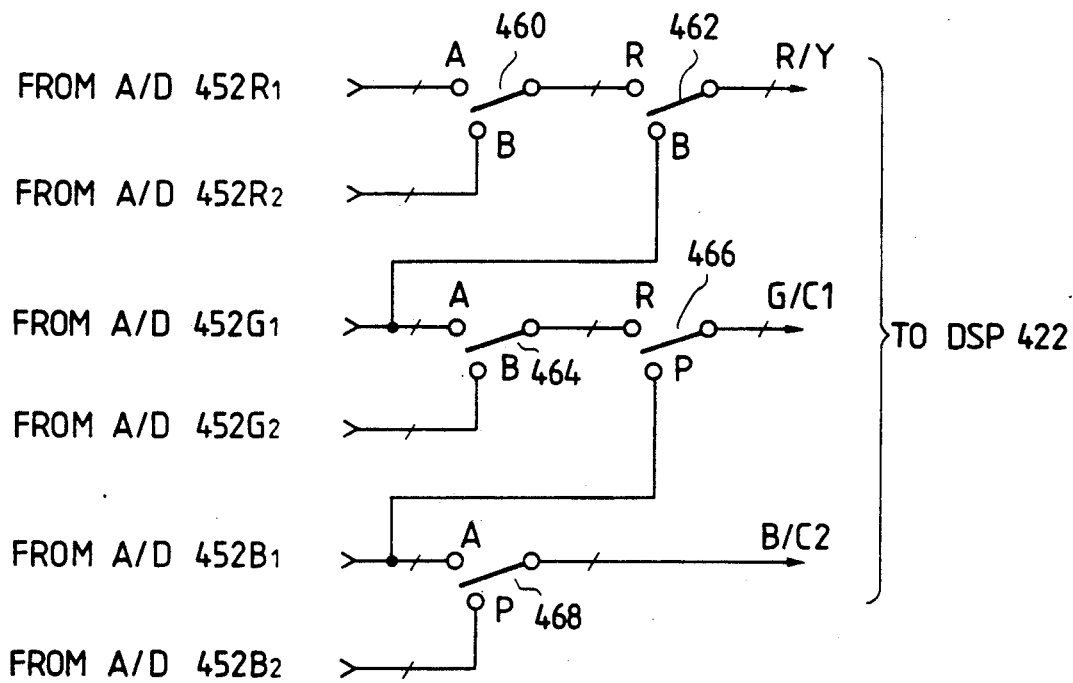
FIG. 26 is a circuit diagram of a multiplexer 454 shown in FIG. 25.

FIG. 26 shows the internal structure of the MPX 454, composed of five switches 460, 462, 464, 466, 468 which are shifted as shown in FIG. 27.

In the recording mode, the switches $446R_1$, $446R_2$, $446G_1$, $446G_2$, $446B_1$, $446B_2$ are all connected to the contacts R. The outputs of the image pickup devices 344R, 344G, 344B are supplied, after sample holding, clamping and A/D conversion, to the MPX 454, which synthesizes said outputs into image signals of three channels of R, G and B for supply to the DSP 422. In the MPX 454, as shown in FIG. 27, the switches 462 and 466 are constantly connected to the contacts R, while the switches 460, 464 and 468 alternately switch the outputs of the A/D converters of two channels.

In the reproducing mode, the switches $446R_1$, $446R_2$, $446G_1$, $446G_2$, $446B_1$, $446B_2$ are all connected to the contacts P. The brightness signal of wide band released from the demodulating circuit 442 is divided into three channels, then subjected to sample holding, clamping and A/D conversion, and supplied to the MPX 454. Also, two color difference signals released from the demodulating circuit 454 are separately subjected to sample holding, clamping and A/D conversion, and are supplied to the MPX 454. The MPX 454 synthesizes the brightness signal of three channels into one channel, but transmits two color difference signals. In the MPX 454, as shown in FIG. 27, the switch 464 is connected to an arbitrary contact, while the switches 466, 468 are connected to the contacts P, and the switches 460 and 462 are shifted at a predetermined interval. In FIG. 27, the switch 464 is connected to the contact B, in order to reduce noises.

In the following the sampling rate of A/D conversion will be explained. The color subcarrier frequency in NTSC format is represented by $f_{sc}$. In the embodiment shown in FIG. 1, the brightness signal is subjected to A/D conversion in two channels with 2 $f_{sc}$, so that the outcome is practically the same as that obtained with sampling at 4 $f_{sc}$ (about 4.3 Msps). Enough bandwidth can be obtained for the line-sequential color difference signal by A/D conversion with one channel and with a sampling rate of 2 $f_{sc}$ (about 7.6 Msps). In the embodiment shown in FIGS. 17 and 18, three A/D converters 122R, 122G, 122B function with the same clock rate, but a sampling rate of 1 $f_{sc}$ (about 3.58 Msps) is naturally enough in consideration of the band-width of the color difference signals (1.5 MHz for I; 0.5 MHz for Q; and 0.5 MHz for R-Y and B-Y).

A sampling rate of about 21 Msps can be practically obtained by operating the A/D converters, capable of functioning with such sampling rate (about 7 Msps), in three parallel channels at the phototaking operation.

Also, in the embodiment shown in FIG. 22, there can be obtained a practical sampling rate of about 21 Msps, by operating the A/D converters at about 7 Msps in three parallel channels at the phototaking operation, as in the embodiment shown in FIG. 8. In the reproducing operation, the sampling is practically conducted at 4 $f_{sc}$, since the brightness signal is sampled with 2 $f_{sc}$ in A/D converters of two channels, followed by synthesis in the multiplexer. The sampling rate for each channel of color difference signal is 3.58 Msps, because said signal is subjected to the A/D conversion with a sampling rate of 2 $f_{sc}$ after conversion into dot-sequential signal. Such a sampling rate is sufficient for the color difference signal, as already explained in relation to the embodiment shown in FIG. 8.

Furthermore, in the embodiment shown in FIG. 25, a sampling rate of about 84 Msps can be obtained at the phototaking operation, if the A/D converters 452R$_1$, 452R$_2$, 452G$_1$, 452G$_2$, 452B$_1$ and 452B$_2$ have a sampling rate of about 14 Msps. In the reproducing operation, a sampling rate of 42 Msps can be obtained for the brightness signal, and a sampling rate of 14 Msps can be obtained for each of two color difference signals.

The foregoing embodiments are designed to process three primary color signals (R, G, B) at the phototaking (and recording) operation, but they may naturally be so designed as to process image signals of complementary colors, such as yellow, magenta and cyan. It is also possible to utilize four colors such as yellow, magenta, cyan and green, to assign four channels to these colors at the recording operation, and to assign two channels to the brightness signal and two channels to the color difference signals at the reproducing operation.

As will be easily understood from the foregoing description, the present invention effectively utilizes plural A/D converter means, thereby achieving high-speed A/D conversion with low-speed A/D converter means. Consequently, it is possible to reduce the magnitude of circuitry and the consumption of electric power. Also, the reduced electric power consumption enables the power supply system to be made more compact.

In the following there will be explained still another embodiment of the present invention.

Figure 28:
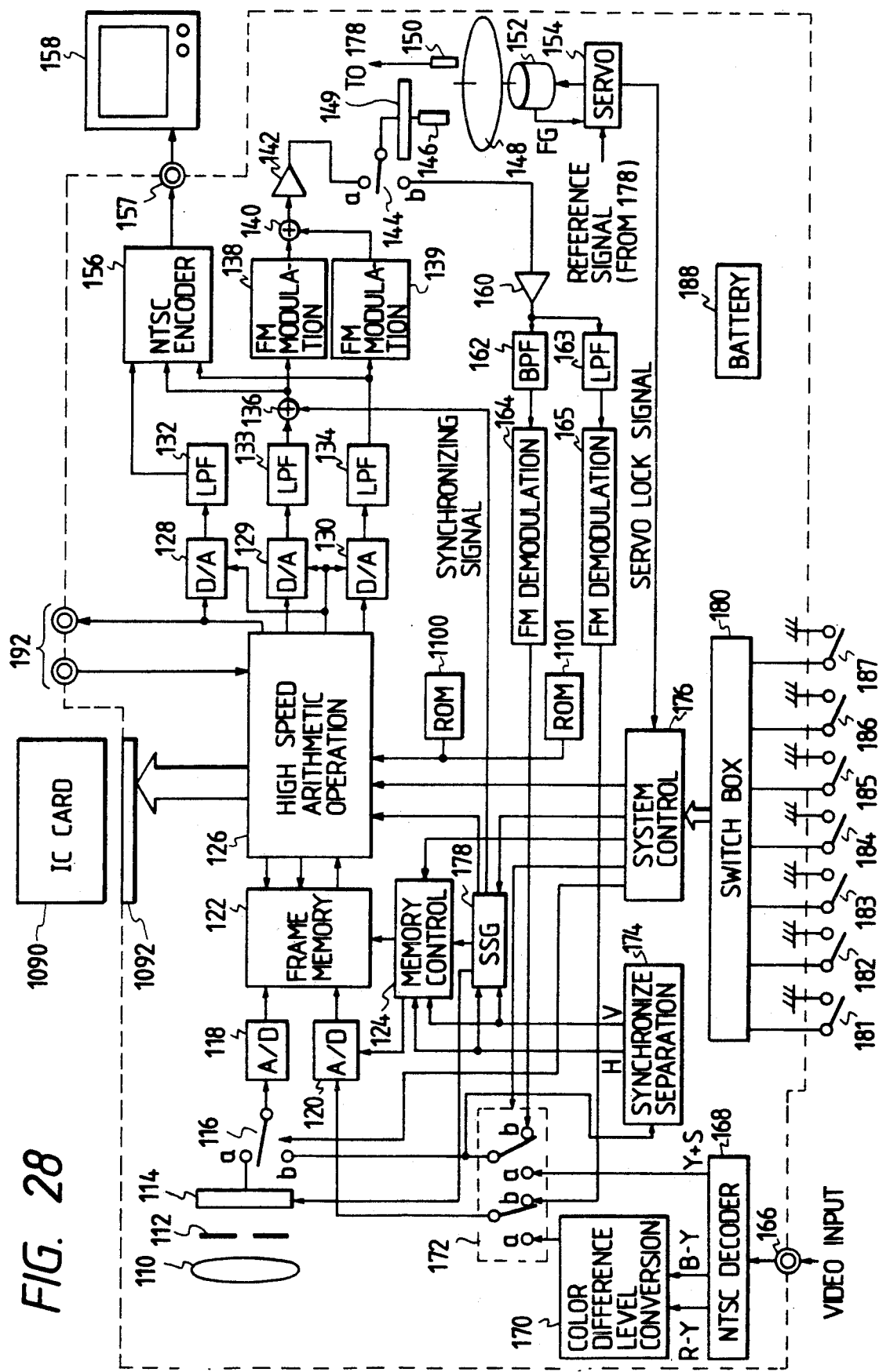
FIG. 28 is a block diagram of still another embodiment of the present invention.

FIG. 28 shows a variation of the embodiment shown in FIG. 1. In said variation there are additionally provided ROM's 100, 101 and a connector 1092 for storing the output of the high speed arithmetic operation unit 6 in a recording medium provided in an IC card 1090.

The ROM 100 stores an algorithm for data compression of a high compression rate (for example a compression algorithm utilizing orthogonal conversion) to be conducted at the data transfer from the high-speed arithmetic operation circuit 26 to the IC card 1090. Said ROM 100 also stores an algorithm for processing the output signal from the image pickup device 14, and an algorithm for processing the output signal from the magnetic disk 48. Also, the ROM 101 stores an algorithm for forming the line simultaneous signal matching the NTSC format from the image data shown in FIG. 7, at the data output to the NTSC encoder 56.

Figure 29:
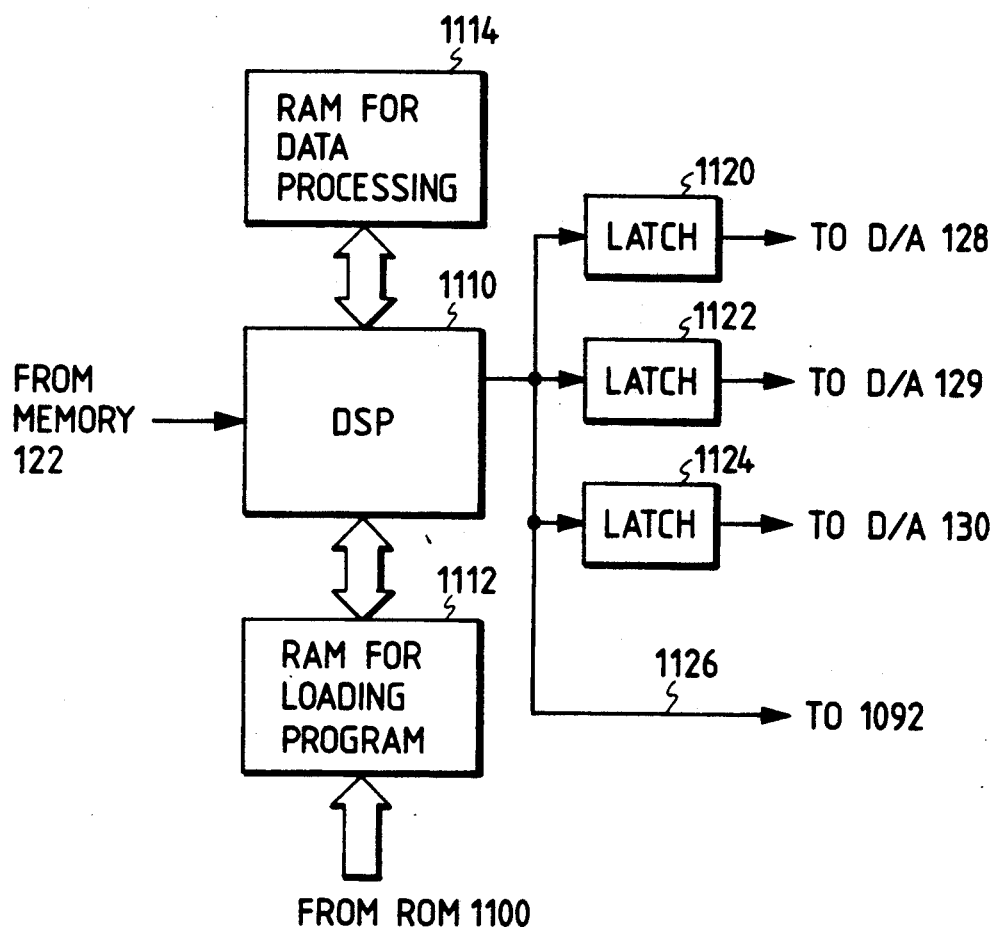
FIG. 29 is a view showing the details of a principal part of the embodiment shown in FIG. 28.

Also, the high speed arithmetic operation circuit 26 is provided, as shown in FIG. 29, with latch circuits 1120, 1122, 1124 for respectively latching the brightness signal and color difference signals R-Y, B-Y released from an input unit for receiving the signal read from the memory 22 or from a digital signal processor (DSP) 1110. There are also provided an output port 1126 for causing the IC card 1090 to release highly compressed data; a program RAM 1112 for storing the program transferred from the ROM 100 or 101 shown in FIG. 28, under the instruction from the system control unit 76; and a work area 1114 to be utilized in the data processing in the DSP 1110.

In the present embodiment, the DSP 1110 can execute various processes according to the programs read from the ROM's 100, 101.

Therefore, in case of data storage into the IC card 1090 mounted on the main body of the apparatus, said data storage is achieved by data compression, such as orthogonal conversion, according to a program stored in the ROM 101.

Also in the present embodiment, since the high-speed arithmetic operation circuit is composed of a digital signal processor as shown in FIG. 29, desired processes can be executed by merely replacing the ROM's 100, 101 with other ROM's storing other programs.

What is claimed is:
1. An image processing apparatus comprising:
   (a) means for converting an input image signal into another signal form;
   (b) first means for giving first control information for causing said conversion means to convert said input image signal into a compressed signal, said first control information corresponding to a variable compression ratio; and
   (c) second means for giving second control information for causing said conversion means to convert said input image signal into a signal adapted to be stored by a medium, said conversion means operating at a first conversion speed in response to said first control information and at a second conversion speed in response to said second control information.

2. An apparatus according to claim 1, wherein said input image signal comprises a dot-sequential color image signal of red, green and blue.

3. An apparatus according to claim 1, wherein the compression process includes an orthogonal conversion process.

4. An apparatus according to claim 1, further comprising means for storing the image signal, compressed by said conversion means, in a semiconductor memory medium.

5. An apparatus according to claim 1, further comprising means for storing the signal, converted so as to be adapted for storage in the medium by said conversion means, in said medium.

6. An apparatus according to claim 1, further comprising means for generating said image signal.

7. An apparatus according to claim 6, wherein said generating means comprises an image pickup device for converting an object image into an image signal.

8. An image processing apparatus comprising:
(a) memory means capable of storing image data of a required amount;
(b) first read-out means for displaying the image data stored in said memory means as a visible image on a monitor;
(c) second read-out means for reading the image data stored in said memory means according to the transfer rate of a transmission channel; and
(d) means for converting, in common, the data read by said first read-out means and by said second read-out means.

9. An apparatus according to claim 8, wherein said conversion means comprises D/A conversion means.

10. An apparatus according to claim 8, wherein said memory means is capable of storing image data of a frame.

11. An apparatus according to claim 8, wherein said first read-out means is adapted to read the image data, stored in said memory means, with a rate synchronized with a standard television signal, in the form of a visible image.

12. An image processing apparatus comprising:
(a) plural A/D conversion means for parallel A/D conversion of an image signal of primary or complementary colors; and
(b) means for assigning at least two of said plural A/D conversion means to a brightness signal, except during the processing of the image signal of said primary or complementary colors.

13. An apparatus according to claim 12, further comprising plural sampling means for sampling said brightness signal at mutually different timings.

14. An apparatus according to claim 12, wherein said A/D conversion means are provided in three units.

15. An apparatus according to claim 14, wherein said image signal of primary colors comprises red, green and blue signals.

16. An apparatus according to claim 12, further comprising:
(c) first supply means for supplying said image signal of primary or complementary colors; and
(d) second supply means for supplying said brightness signal.

17. An apparatus according to claim 16, wherein said first supply means comprises means for converting an object image into the image signal of primary or complementary colors.

18. An apparatus according to claim 16, wherein said second supply means comprises means for reproducing the brightness signal from a recording medium.

* * * * *

UNITED STATES PATENT AND TRADEMARK OFFICE
CERTIFICATE OF CORRECTION

PATENT NO. : 5,134,487
DATED : July 28, 1992
INVENTOR(S) : Taguchi et al.

It is certified that error appears in the above-identified patent and that said Letters Patent is hereby corrected as shown below:

On the title page, item [54] and column 1, lines 1-2

"USING COMMON CIRCUITRY FOR DIFFERENT SIGNALS" should read --IMAGE PROCESSING APPARATUS USING COMMON CIRCUITRY FOR DIFFERENT SIGNALS--.

Title page, item
[30] Foreign Application Priority Data

Insert:  --[30] Foreign Application Priority Data
         November 6, 1989 [JP] Japan.....1-288561
         November 6, 1989 [JP] Japan.....1-288563
         October 24, 1990 [JP] Japan.....2-284385--

COLUMN 1

Line 2, "USING" should read --IMAGE PROCESSING APPARATUS USING--.
Line 40, "image," should read --image--.
Line 56, "w" should be deleted, and insert --a--.
Line 57, "recording" should read --a recording--.

COLUMN 2

Line 6, "complimentary" should read --complementary--.
Line 27, "complimentary" should read --complementary--.

COLUMN 3

Line 35, "of in" should read --in--.

COLUMN 6

Line 42, "fetching" should read --writing--; and
Line 56, "of" should read --in which--.

UNITED STATES PATENT AND TRADEMARK OFFICE
CERTIFICATE OF CORRECTION

PATENT NO. : 5,134,487
DATED : July 28, 1992
INVENTOR(S) : Taguchi et al.

It is certified that error appears in the above-identified patent and that said Letters Patent is hereby corrected as shown below:

COLUMN 8

Line 35, "drive should read --driven--.

COLUMN 10

Line 10, "on" should read --the--;
Line 11, "from the" should read --by an-- and "by" should read --from--;
Line 50, "addressible" should read --addressable--; and
Line 68, "time)" should read --time--.

COLUMN 11

Line 17, "determined" should read --is determined--.

COLUMN 12

Line 35, "is" should be deleted.

COLUMN 13

Line 12, "switch 42" should read --switch 142--.

COLUMN 14

Line 21, "noises" should read --noise--;
Line 24, "and" should be deleted; and
Line 45, "embodiment, in" should read --embodiment. In--

UNITED STATES PATENT AND TRADEMARK OFFICE
CERTIFICATE OF CORRECTION

PATENT NO. : 5,134,487

DATED : July 28, 1992

INVENTOR(S) : Taguchi et al.

It is certified that error appears in the above-identified patent and that said Letters Patent is hereby corrected as shown below:

COLUMN 16

Line 15, "circuit 60C." should read --circuit 160C.--
Line 17, "samplehold" should read --sample-hold--;
Line 21, "effects" should read --effect--;
Line 25, "lies" should read --lies in--;
Line 46, "multi-plexing" should read --multiplexing--; and
Line 60, "output 24a" should read --output 124a--.

COLUMN 17

Line 57, "the row" should read --a row-- and "a" should read --the--.

COLUMN 18

Line 4, "signal 124c" should read --signal 124c from--.

COLUMN 21

Line 16, "counter 308;" should read --counter 306;--.

UNITED STATES PATENT AND TRADEMARK OFFICE
CERTIFICATE OF CORRECTION

PATENT NO. : 5,134,487

DATED : July 28, 1992

INVENTOR(S) : Taguchi et al.

It is certified that error appears in the above-identified patent and that said Letters Patent is hereby corrected as shown below:

COLUMN 22

Line 3, "MPS 124." should read --MPX 124.--;
Line 18, "the" (second occurrence) should be deleted;
Line 19, "same" should read --the same--;
Line 44, "D/A converters 26Y," should read --D/A converters 426Y,--;
Line 46, "low-pass filters (LPF) 428Y, 30" should read --low-pass filters (LPF) 428Y,430--; and
Line 48, "low-pass filter (LPF) 28C" should read --low-pass filter (LPF) 428C--.

COLUMN 23

Line 23, "int he" should read --in the--.

COLUMN 24

Line 2, "of." should read --of noise.--;
Line 17, "same" should read --the same--;
Line 18, "same" should read --the same--;
Line 48, "344R, 344G, 344B" should read --444R, 444G, 444B--.

UNITED STATES PATENT AND TRADEMARK OFFICE
CERTIFICATE OF CORRECTION

PATENT NO. : 5,134,487
DATED : July 28, 1992
INVENTOR(S) : Taguchi et al.

It is certified that error appears in the above-identified patent and that said Letters Patent is hereby corrected as shown below:

<u>COLUMN 25</u>

Line 5, "noises." should read --noise.--.

<u>COLUMN 28</u>

Line 5, "conversion" should read --conversions--.

Signed and Sealed this

Twenty-eighth Day of September, 1993

Attest:

BRUCE LEHMAN

*Attesting Officer*    *Commissioner of Patents and Trademarks*